(12) United States Patent
Hasejima et al.

(10) Patent No.: US 11,358,640 B2
(45) Date of Patent: Jun. 14, 2022

(54) PARKING ASSISTANCE DEVICE

(71) Applicant: CLARION CO., LTD., Saitama (JP)

(72) Inventors: Noriyasu Hasejima, Tokyo (JP);
Takehito Ogata, Tokyo (JP); Makoto Ishinoda, Saitama (JP); Shinya Tagawa, Saitama (JP)

(73) Assignee: CLARION CO., LTD., Tokyo (JP)

( * ) Notice: Subject to any disclaimer, the term of this patent is extended or adjusted under 35 U.S.C. 154(b) by 115 days.

(21) Appl. No.: 16/603,509

(22) PCT Filed: Mar. 28, 2018

(86) PCT No.: PCT/JP2018/012720
§ 371 (c)(1),
(2) Date: Oct. 7, 2019

(87) PCT Pub. No.: WO2018/186253
PCT Pub. Date: Oct. 11, 2018

(65) Prior Publication Data
US 2020/0031397 A1    Jan. 30, 2020

(30) Foreign Application Priority Data

Apr. 7, 2017 (JP) .............................. JP2017-077106

(51) Int. Cl.
*B62D 15/02* (2006.01)
*G01C 21/34* (2006.01)
(52) U.S. Cl.
CPC ......... *B62D 15/0285* (2013.01); *G01C 21/34* (2013.01)
(58) Field of Classification Search
CPC ................................................ B62D 15/0285
See application file for complete search history.

(56) References Cited

U.S. PATENT DOCUMENTS 9,969,386 B1 * 5/2018 Wang ................. B62D 15/0285
10,960,926 B2 * 3/2021 Kim .................... B62D 15/0285
(Continued)

FOREIGN PATENT DOCUMENTS

DE      102011086281 A1    5/2013
JP      2001-018821 A      1/2001
(Continued)

OTHER PUBLICATIONS

Extended European Search Report dated Nov. 27, 2020 for European Patent Application No. 18780385.3.
(Continued)

*Primary Examiner* — Jeff A Burke
*Assistant Examiner* — Madison B Emmett
(74) *Attorney, Agent, or Firm* — Volpe Koenig

(57) ABSTRACT

An object of the present invention is to provide a parking assistance device capable of computing a parking path that is suitable for given circumstances or user's needs. A parking assistance device of the present invention is a parking assistance device for assisting in parking a vehicle in a parking space provided on one side of a road, the parking assistance device being configured to compute a first parking path for starting moving the vehicle forward from the initial position thereof, and a second parking path for starting moving the vehicle backward from the initial position thereof, select one of the first parking path or the second parking path on the basis of a preset evaluation function, and set the selected path as a parking path to be used.

7 Claims, 20 Drawing Sheets

(56) References Cited

U.S. PATENT DOCUMENTS

| | | | |
|---|---|---|---|
| 2004/0260439 A1* | 12/2004 | Endo | B60Q 1/48 |
| | | | 348/148 |
| 2010/0049402 A1* | 2/2010 | Tanaka | B60W 10/20 |
| | | | 701/41 |
| 2010/0156671 A1 | 6/2010 | Lee et al. | |
| 2010/0271236 A1* | 10/2010 | Moshchuk | B62D 15/0285 |
| | | | 340/932.2 |
| 2014/0052336 A1* | 2/2014 | Moshchuk | B62D 15/0285 |
| | | | 701/41 |
| 2015/0134185 A1* | 5/2015 | Lee | G05D 1/0214 |
| | | | 701/26 |
| 2015/0151789 A1* | 6/2015 | Lee | B62D 15/0285 |
| | | | 701/41 |
| 2018/0120853 A1* | 5/2018 | Seo | B62D 15/0285 |
| 2019/0367013 A1* | 12/2019 | Yoo | B60W 30/06 |

FOREIGN PATENT DOCUMENTS

| | | |
|---|---|---|
| JP | 2007-062623 A | 3/2007 |
| JP | 2010-208392 A | 9/2010 |
| JP | 2017-052434 A | 3/2017 |

OTHER PUBLICATIONS

International Search Report for PCT/JP2018/012720, dated Jul. 3, 2018.
Japanese Office Action dated May 26, 2020 for the Japanese Patent Application No. 2017-077106.
Chinese Office Action dated Feb. 23, 2022 for Chinese Patent Application No. 201880023815.8.

* cited by examiner

PARKING ASSISTANCE DEVICE

TECHNICAL FIELD

The present invention relates to a parking assistance device for a vehicle.

BACKGROUND ART

Patent Literature 1 discloses a technique of a parking assistance device that assists in parking a vehicle by computing a guidance path, which includes switching of the direction of vehicle travel for parking the vehicle, so that the vehicle can reach a target position along the guidance path.

CITATION LIST

Patent Literature

Patent Literature 1: JP 2010-208392 A

SUMMARY OF INVENTION

Technical Problem

However, such a computed guidance path has problems in that, for example, it has a low success rate of completion of parking, the vehicle is located too far away from the target parking position while being parked, or the parking process involves too many switching of the direction of vehicle travel between forward drive and reverse drive, thus requiring a long time. Therefore, such a guidance path may not be suitable for given circumstances or user's needs.

The present invention has been made in view of the foregoing. It is an object of the present invention to provide a parking assistance device capable of computing a parking path that is suitable for given circumstances or user's needs.

Solution to Problem

The parking assistance device of the present invention that solves the aforementioned problem is a parking assistance device for assisting in parking a vehicle in a parking space that is provided on one side of a road, the parking assistance device being configured to compute a first parking path for starting moving the vehicle forward from the initial position of the vehicle, and a second parking path for starting moving the vehicle backward from the initial position of the vehicle, select one of the first parking path or the second parking path on the basis of a preset evaluation function, and set the selected path as a parking path to be used.

Advantageous Effects of Invention

According to the present invention, a parking path that is suitable for given circumstances or user's needs can be computed. Further features related to the present invention will become apparent from the description of the specification and the accompanying drawings. In addition, other problems, configurations, and advantageous effects will become apparent from the following description of embodiments.

DESCRIPTION OF EMBODIMENTS

Next, embodiments of the present invention will be described with reference to the drawings.

Figure 1:
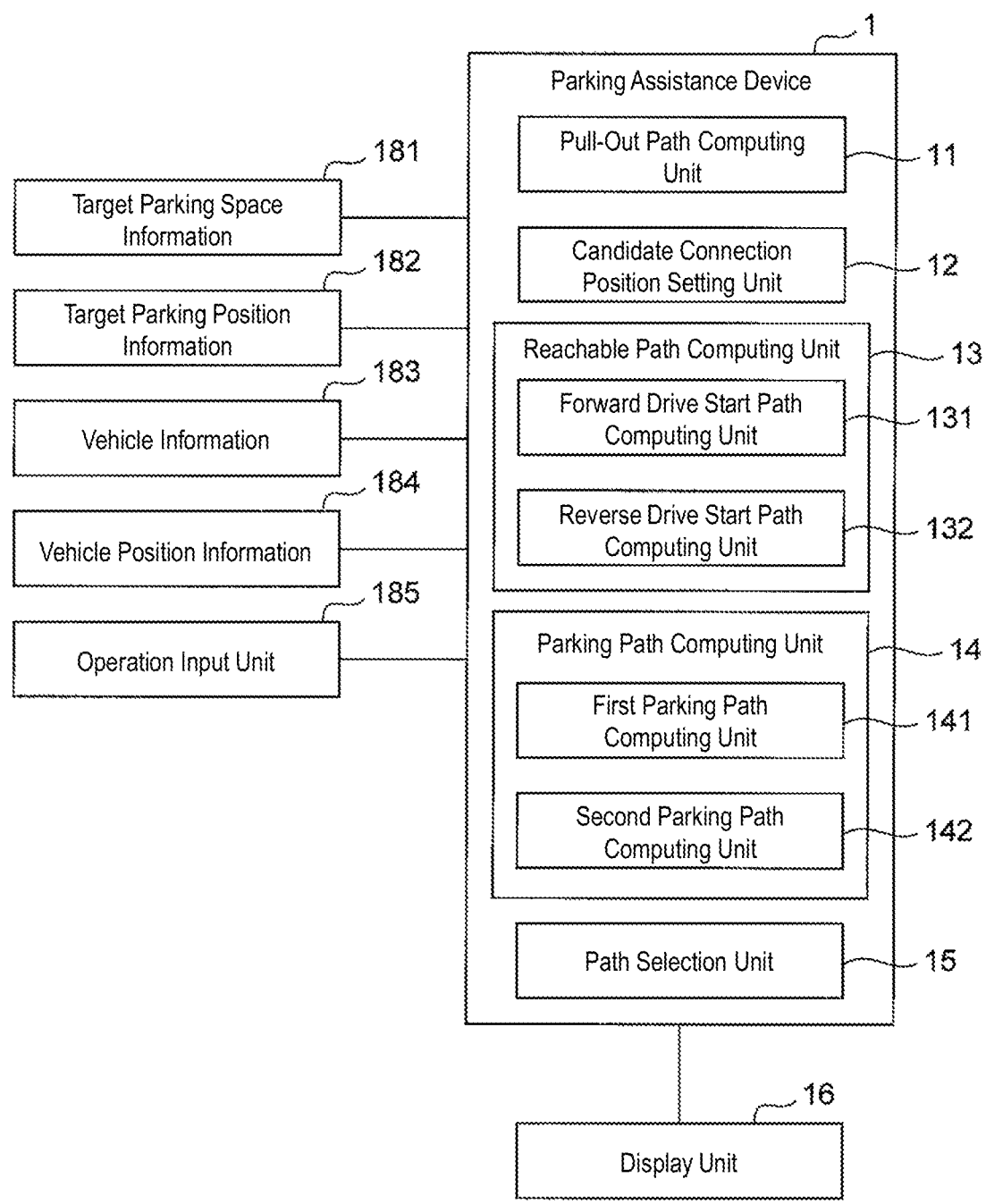
FIG. 1 is a functional block diagram of a parking assistance device according to an embodiment of the present invention.
Figure 2A:
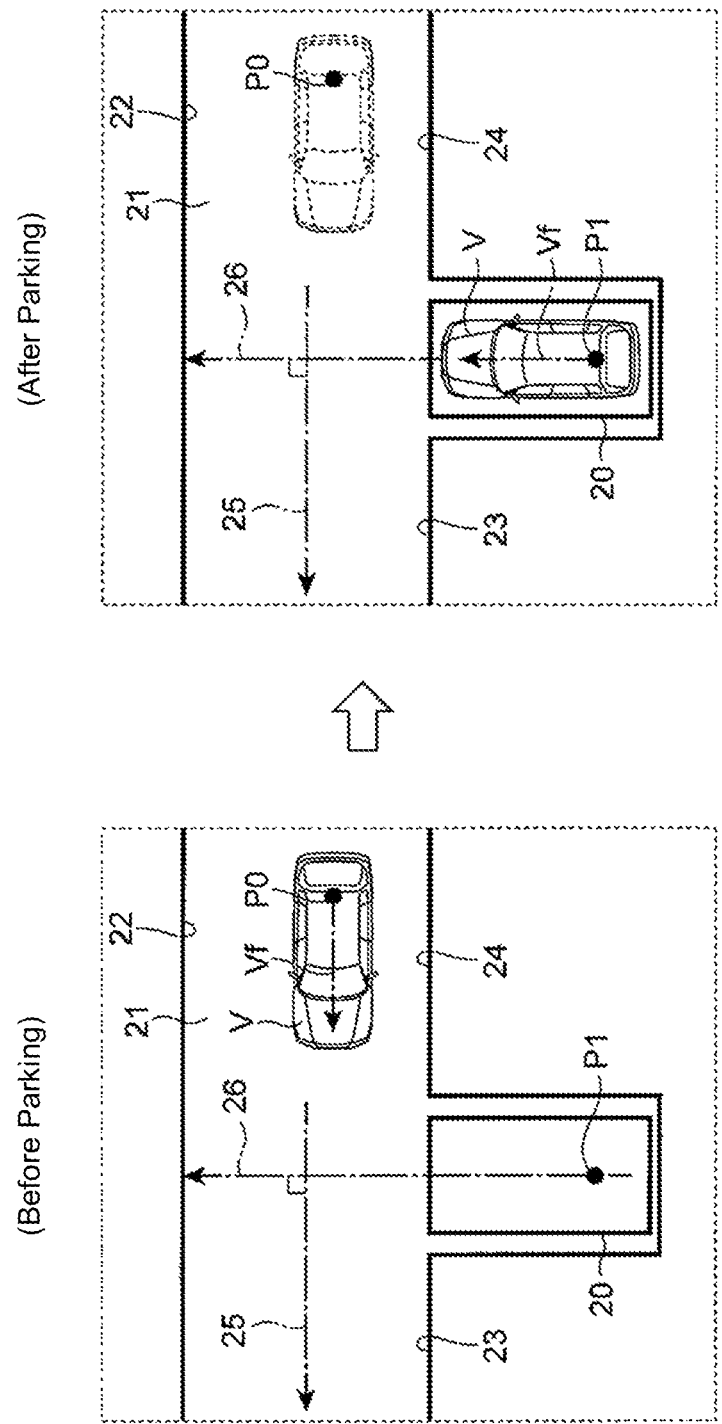
FIG. 2A illustrate the state of back-in perpendicular parking, specifically, the state of a vehicle before and after the parking.
Figure 2B:
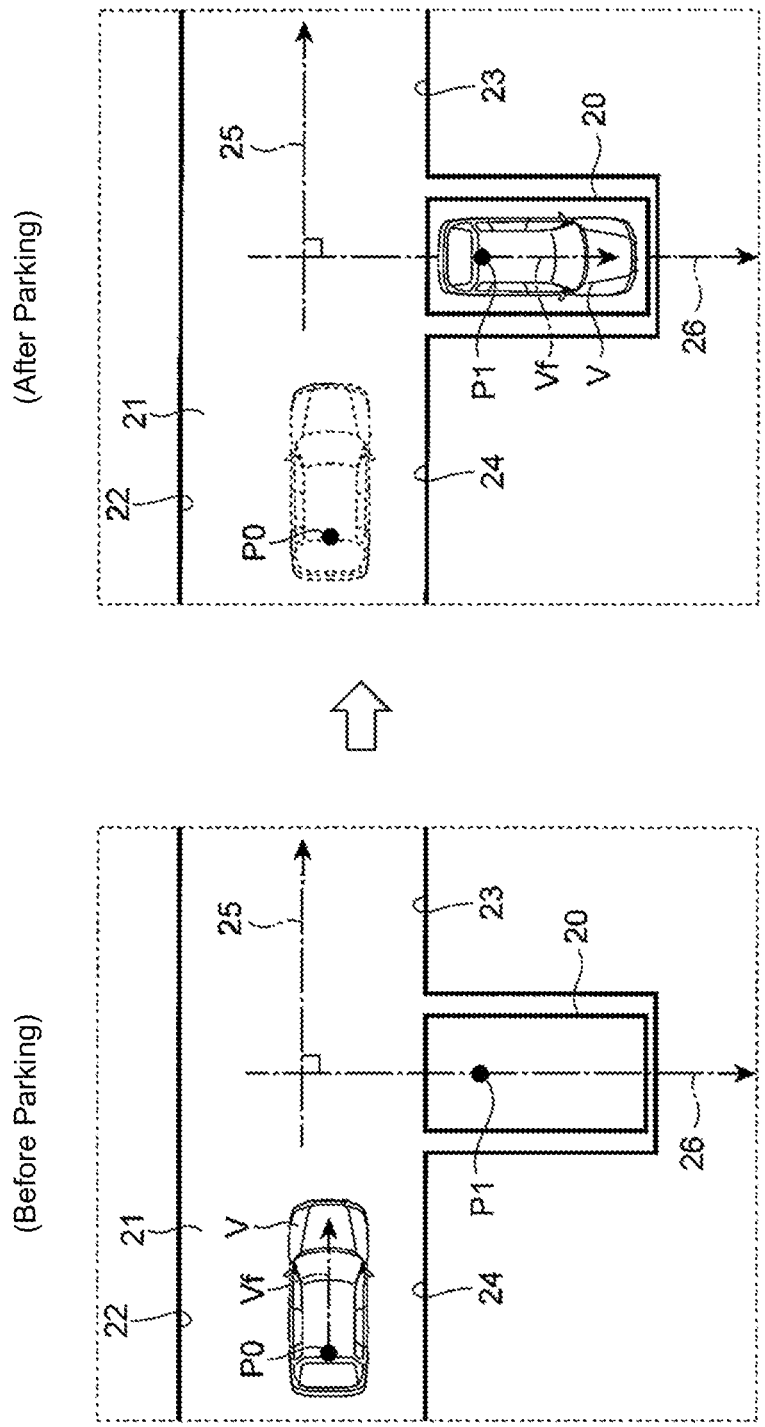
FIG. 2B illustrate the state of front-in perpendicular parking, specifically, the state of a vehicle before and after the parking.

FIG. 1 is a functional block diagram of a parking assistance device according to an embodiment of the present invention. FIG. 2A illustrate the state of back-in perpendicular parking, specifically, the state of a vehicle before and after the parking. FIG. 2B illustrate the state of front-in perpendicular parking, specifically, the state of a vehicle before and after the parking.

The parking assistance device 1 is a device for assisting in parking a vehicle V in a parking space 20, and in particular, a device for assisting in so-called perpendicular parking so that the vehicle V is parked in the parking space 20 having a parking orientation 26 arranged at right angles to a road orientation 25 of a road 21. The parking space 20 means a zoned area having a parking orientation set therein in advance so as to allow a vehicle to be parked in a predetermined orientation in the parking space 20. The parking space 20 is also referred to as a parking frame, parking slot, parking area, paring place, or parking lot, for example.

In the example illustrated in FIG. 2A, the parking space 20 is provided on the left side with respect to the road orientation 25 of the road 21, and has the parking orientation 26 set therein so as to allow the vehicle V to be reverse parked in the parking space 20. In the example illustrated in FIG. 2B, the parking space 20 is provided on the right side with respect to the road orientation 25 of the road 21, and has the parking orientation 26 set therein so as to allow the vehicle V to be front-in parked in the parking space 20.

As illustrated in FIGS. 2A and 2B, the parking assistance device 1 computes a path for guiding the vehicle V so that the vehicle V is arranged with the vehicle orientation Vf directed in the same orientation as the parking orientation 26 at the target parking position P1 in the parking space 20 from the state in which the vehicle V is at the initial position P0 on the road 21 with the vehicle orientation Vf directed in the same orientation as the road orientation 25, and sets the computed path as a parking path.

As the parking path to be used, a first parking path for starting moving the vehicle V forward from the initial position P0 thereof, and a second parking path for starting moving the vehicle V backward from the initial position P0 thereof are computed, and when both the first parking path and second parking path can be computed, one of the first parking path or the second parking path is selected on the basis of a preset evaluation function.

In the parking environment in which the vehicle V is parked, as illustrated in FIGS. 2A and 2B, obstacles 23 and 24, such as other vehicles or other parking spaces, are arranged ahead of or behind the parking space 20 along the road 21, and also, an obstacle 22, such as a wall or a curb extending along the road orientation 25 of the road 21 or another vehicle, is arranged across the road 21 opposite to the parking space 20. It should be noted that in the present embodiment, the obstacles 23 and 24 are always present on the opposite sides of the parking space 20.

Whether the vehicle V is at the initial position P0, the target parking position P1, a back-up position P2, a park-out position B, or the like is determined with reference to a reference point Vo that is an intermediate position between the right and left rear wheels of the vehicle V. In addition, the vehicle is turned along a clothoid curve, for example.

The parking assistance device 1 computes a parking path for guiding the vehicle V into the parking space 20. The vehicle V can be parked in the parking space 20 on the side of the road by moving along the computed parking path. The parking assistance device 1 computes the first parking path and the second parking path, and selects one of them as the parking path to be used on the basis of an evaluation function. Therefore, the vehicle V can be parked along the parking path that is suitable for given circumstances or user's needs.

The vehicle V may be moved by being operated by the driver while he/she is watching an in-vehicle monitor that displays the parking path, for example. Alternatively, a system may be configured such that information on the parking path is output from the parking assistance device 1 and the vehicle V is parked at the target parking position P1 either automatically or semi-automatically. When the vehicle V is parked semi-automatically, steering wheel operations are controlled automatically, while accelerator and brake operations are conducted by the driver, for example. Meanwhile, when the vehicle V is parked automatically, all of the steering wheel operations and accelerator and brake operations are controlled automatically.

The parking assistance device 1 is mounted on the vehicle V, and is implemented through cooperative operations of hardware, such as a microcomputer, and a software program. The parking assistance device 1 includes, as illustrated in FIG. 1, a pull-out path computing unit 11, a candidate connection position setting unit 12, a reachable path computing unit 13, a parking path computing unit 14, and a path selection unit 15.

The pull-out path computing unit 11 computes at least one pull-out path for pulling the vehicle V out of the target parking space 20 on the basis of information on the target parking space and constraint conditions regarding vehicle behavior. The candidate connection position setting unit 12 sets a plurality of candidate connection positions on each pull-out path. The reachable path computing unit 13 computes a reachable path that allows the vehicle V to reach each candidate connection position from the initial position P0 as the current position of the vehicle V.

The reachable path computing unit 13 computes a forward drive start path for starting moving the vehicle V forward from the initial position P0 thereof to allow the vehicle V to reach at least one of the plurality of candidate connection positions, and a reverse drive start path for starting moving the vehicle V backward from the initial position P0 thereof to allow the vehicle V to reach at least one of the plurality of candidate connection positions.

The parking path computing unit 14 sets a parking path for the vehicle V by connecting the pull-out path and the reachable path. The parking path computing unit 14 computes the first parking path by connecting the forward drive start path and the pull-out path at a first park-out position B1 that is one of the plurality of candidate connection positions that can be reached along the forward drive start path, and computes the second parking path by connecting the reverse drive start path and the pull-out path at a second park-out position B2 that is one of the plurality of candidate connection positions that can be reached along the reverse drive start path.

When both the first parking path and the second parking path can be computed by the parking path computing unit 14, the path selection unit 15 selects one of them on the basis of an evaluation function, and sets the selected parking path as the parking path to be used. Meanwhile, when only one of the first parking path or the second parking path can be computed, the path selection unit 15 sets the computed parking path as the parking path to be used.

The parking assistance device 1 receives, as illustrated in FIG. 1, target parking space information 181, target parking position information 182, vehicle information 183, and vehicle position information 184. The target parking space information 181 includes information on constraint conditions regarding a parking space, such as the positions of and distances to obstacles around the parking space 20.

The target parking position information 182 includes information, such as the shape of the parking space 20 and the relative position of the parking space 20 with respect to the vehicle V. The target parking space information 181 and the target parking position information 182 can be obtained from an external recognition sensor mounted on the vehicle, such as a detected signal of an ultrasonic sensor mounted on the vehicle V or an image from an in-vehicle camera, for example. In addition, infrastructure information output from a parking facility may be obtained.

The vehicle information 183 includes information on constraint conditions regarding vehicle behavior, such as a turning radius of the vehicle V. For the vehicle position information 184, dead reckoning positions computed with a vehicle model on the basis of the steering angle and speed of the vehicle V as well as the number of revolutions of the wheels may be used, and also, positional information obtained with a sensor, such as a GPS, or vehicle position information obtained through road-vehicle communication or inter-vehicle communication may be used.

The operation input unit 185 inputs to the parking assistance device 1 information on a parking space selected by a user, for example. The display unit 16 is an in-vehicle monitor that the driver can watch in the vehicle, and can display the positions for switching the direction of vehicle travel for a target parking path in a manner overlapped with a video from a camera. The display unit 16 may display not only the positions for switching the direction of vehicle travel but also the entire parking path. Then, the driver is able to watch and check the positions for switching the direction of vehicle travel as well as a parking path displayed on the in-vehicle monitor.

Next, the configuration of each of the pull-out path computing unit 11, the candidate connection position setting unit 12, the reachable path computing unit 13, the parking path computing unit 14, and the path selection unit 15 of the parking assistance device 1 will be described in detail.

<Pull-Out Path Computing Unit>

The pull-out path computing unit 11 computes a pull-out path on the basis of the target parking space information 181, the target parking position information 182, and the vehicle information 183.

The pull-out path is a virtual movement path obtained by estimating a path along which the vehicle V is pulled out of the parking space 20 from the state in which the vehicle V is correctly arranged in the parking space 20. The pull-out path is computed totally independently of and without relevance to the initial position P0 of the vehicle V. The pull-out path computing unit 11 does not use the vehicle position information 184 when computing the pull-out path. More than one pull-out path may be computed, and at least one pull-out path is computed.

The pull-out path is computed on the basis of information on the target parking space and the constraint conditions regarding vehicle behavior. For example, when back-in perpendicular parking is assisted, provided that the target parking position P1 is the origin, a path, which is based on the premise that the vehicle V will be pulled out of the parking space in the same direction as the orientation of the vehicle V at the initial position P0, is created, while when front-in perpendicular parking is assisted, provided that the target parking position P1 is the origin, a path, which is based on the premise that the vehicle V will be pulled out of the parking space in the direction opposite to the orientation of the vehicle V at the initial position P0, is created.

For example, when back-in perpendicular parking is assisted to allow the vehicle V to be reverse parked at the target parking position P1, the following paths are computed: a path for moving the vehicle V straight forward from the target parking position P1 until the reference point Vo that is an intermediate position between the right and left rear wheels of the vehicle V (hereinafter referred to as a "position Vo" of the vehicle) reaches a position outside of the parking space 20; a forward drive path for moving the vehicle V forward while turning it in the same direction as the orientation of the vehicle V at the initial position P0 so as to leave the parking space until the vehicle V reaches a reachable limit position with respect to an obstacle ahead; and a reverse drive path for backing up the vehicle V with its front wheels adjusted straight again with respect to the vehicle V until the vehicle V reaches a reachable limit position with respect to an obstacle behind. The forward drive path and the reverse drive path are alternately computed to compute a pull-out path until a predetermined termination condition is satisfied. It should be noted that the "reachable limit position" means a position at which the vehicle V is away from an obstacle with a predetermined gap therebetween. The predetermined gap includes a predetermined error taken into consideration as a margin so that the vehicle V will not contact the obstacle. The predetermined gap is preferably as small as possible, and is set to about 1 to 5 cm, for example. In the present embodiment, a virtual frame with a predetermined gap is set in a region around the outer periphery of the vehicle V, and a position at which the virtual frame contacts the obstacle is determined as a reachable limit position.

Meanwhile, when front-in perpendicular parking is assisted to allow the vehicle V to be front-in parked at the target parking position P1, the following paths are computed: a path for backing up the vehicle V straight from the target parking position P1 until the position Vo of the vehicle V reaches a point that is away from the parking space 20 by a predetermined distance; a reverse drive path for backing up the vehicle V while turning it in a direction opposite to the orientation of the vehicle V at the initial position P0 so as to leave the parking space until the vehicle V reaches a reachable limit position with respect to an obstacle behind; and a forward drive path for moving the vehicle V forward while turning it in the same direction as the orientation of the vehicle V at the initial position P0 so as to leave the parking space until the vehicle V reaches a reachable limit position with respect to an obstacle ahead. The forward drive path and the reverse drive path are alternately computed to compute a pull-out path until a predetermined termination condition is satisfied.

The pull-out path computing unit 11 computes a pull-out path until at least one of the following conditions is satisfied as the predetermined termination condition, for example: a first condition in which the vehicle orientation Vf of the vehicle V on the pull-out path has an angle greater than or equal to 90° [deg] with respect to the parking orientation 26 and is in parallel with and in the same orientation as the road orientation 25, a second condition in which the vehicle V has reached a point that is away from the target parking position P1 by a predetermined distance Hmax along the road orientation 25, or a third condition in which the number of switching of the direction of vehicle travel on the pull-out path has reached a predetermined number.

Figure 3:
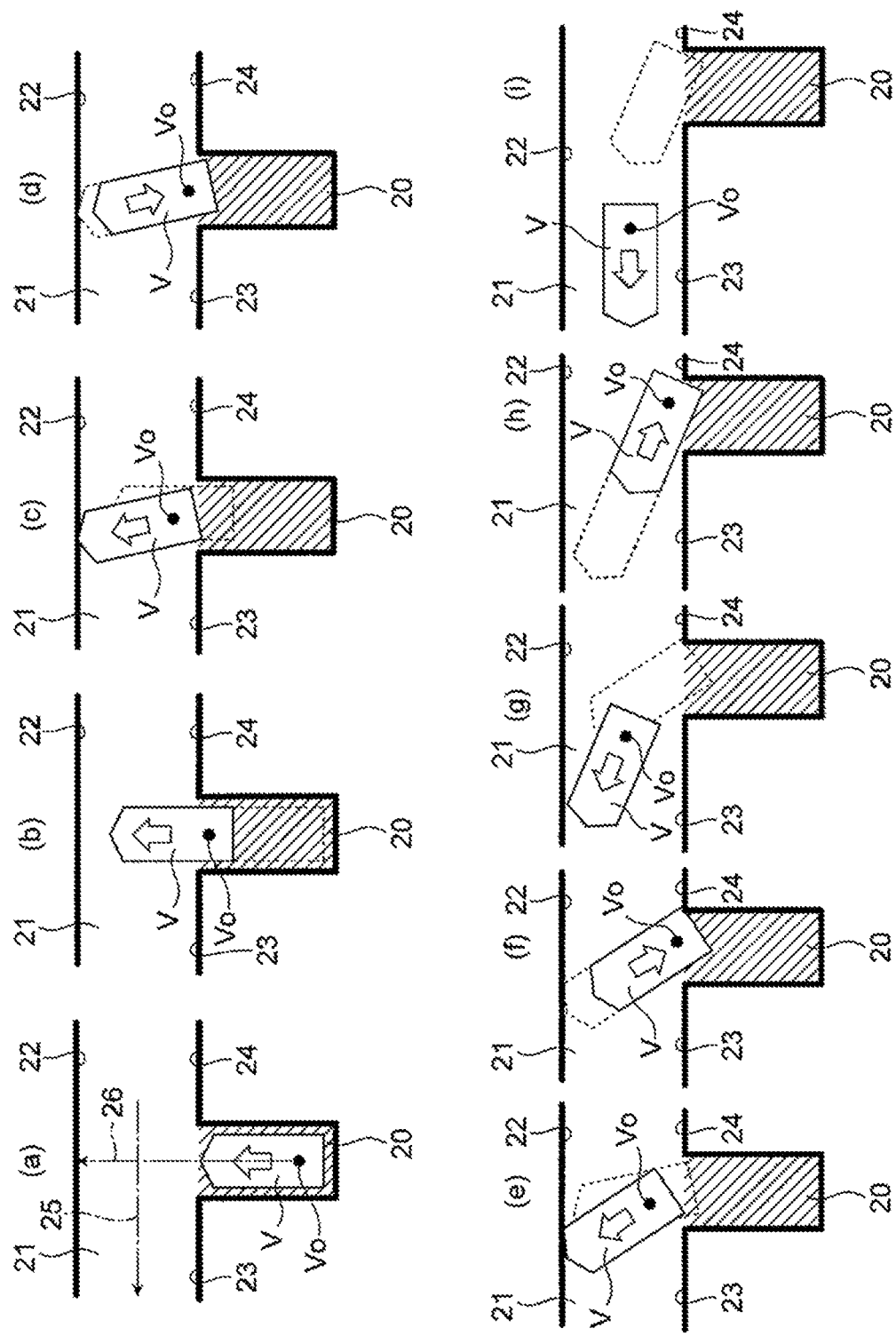
FIG. 3 illustrate an exemplary method of computing a pull-out path for back-in perpendicular parking.
Figure 4:
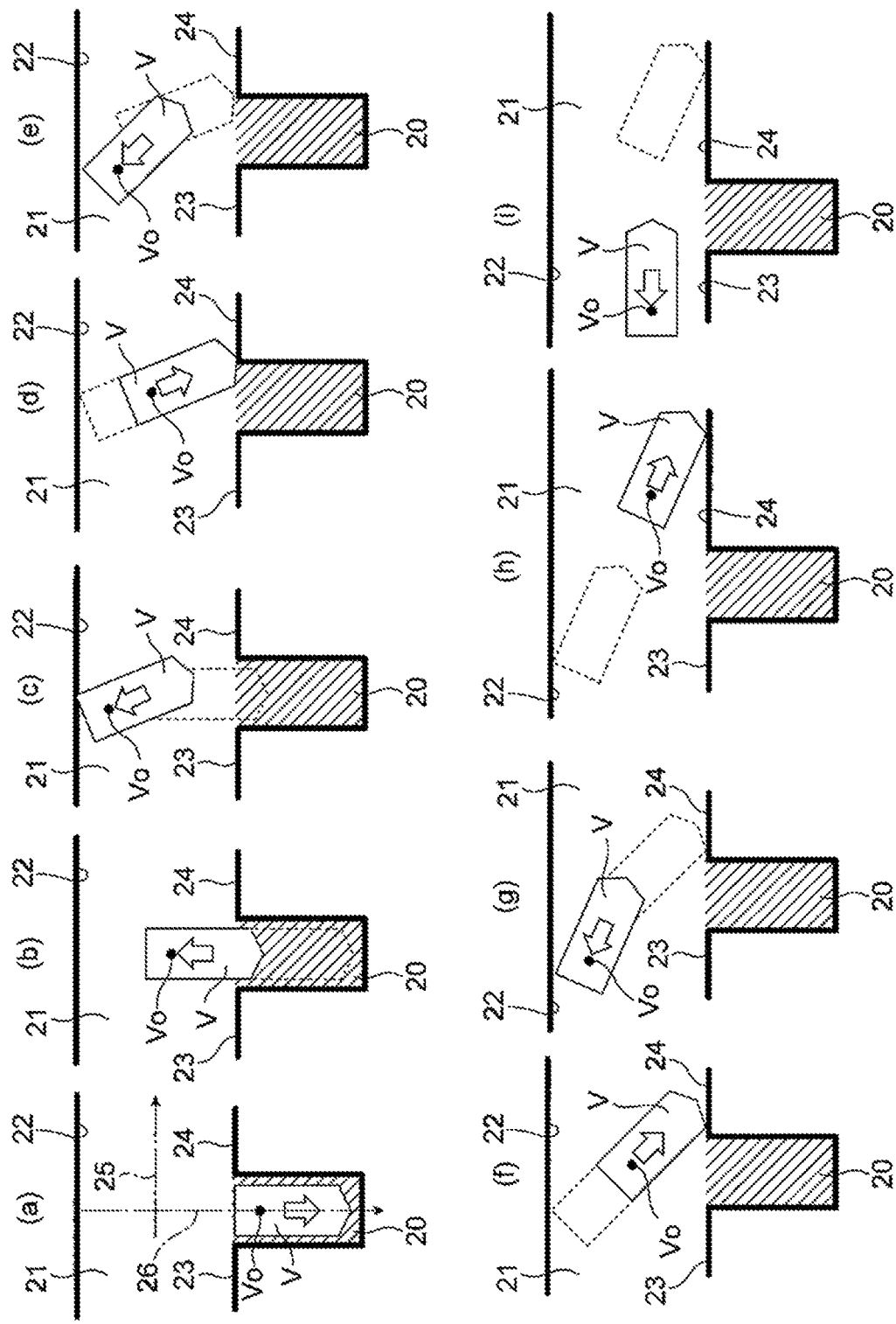
FIG. 4 illustrate an exemplary method of computing a pull-out path for front-in perpendicular parking.

FIGS. 3 and 4 each illustrate an exemplary method of computing a pull-out path for a vehicle according to preset conditions. Specifically, FIG. 3 illustrate a case for back-in perpendicular parking, and FIG. 4 illustrate a case for front-in perpendicular parking.

The pull-out path is computed as follows for back-in perpendicular parking exemplarily illustrated in FIG. 3, for example: (a) the vehicle V is moved straight forward from the state in which the vehicle V is parked in the parking space 20, (b) the position Vo of the vehicle V reaches a position outside of the parking space 20, (c) the vehicle V is moved forward from that position while being turned to the left until the vehicle V reaches a reachable limit position with respect to the obstacle 22 ahead, (d) the vehicle V is backed up from that position with its front wheels adjusted straight again along the vehicle orientation of the vehicle V until the vehicle V reaches a reachable limit position with respect to the obstacle 24 behind, and then, the vehicle V is moved along (e) a forward drive path for moving the vehicle V forward while turning it to the left, (f) a reverse drive path for backing up the vehicle V straight, (g) a forward drive path for moving the vehicle V forward while turning it to the left, and (h) a reverse drive path for backing up the vehicle V straight so that (i) the vehicle orientation Vf of the vehicle V has an angle of 90° [deg] with respect to the parking orientation 26 of the parking space 20 and is in parallel with and in the same orientation as the road orientation 25.

Similarly, the pull-out path is computed as follows for front-in perpendicular parking exemplarily illustrated in FIG. 4, for example: (a) the vehicle V is backed up straight from the parking space 20 from the state in which the vehicle V is parked at the target parking position P1, (b) the position Vo of the vehicle V reaches a point that is away from the parking space 20 by a predetermined distance, (c) the vehicle V is backed up while being turned to the right until the vehicle V reaches a reachable limit position with respect to the obstacle 22 behind, (d) the vehicle V is moved forward from that position while being turned to the left until the vehicle V reaches a reachable limit position with respect to the obstacle 22 ahead, and then, the vehicle V is moved along (e) a reverse drive path for backing up the vehicle V while turning it to the right, (f) a forward drive path for moving the vehicle V forward while turning it to the left, (g) a reverse drive path for backing up the vehicle V while turning it to the right, and (h) a forward drive path for moving the vehicle V forward while turning it to the left so that (i) the vehicle orientation of the vehicle V has an angle of 90° [deg] with respect to the parking orientation of the parking space 20 and is in parallel with and in the same orientation as the road orientation 25.

It should be noted that the method of computing the pull-out path is not limited to the ones described above, and computation may be performed using other conditions. Further, computation may be performed using a condition suitable for a target parking space that has been selected from among a plurality of preset conditions.

<Candidate Connection Position Setting Unit>

The candidate connection position setting unit 12 sets a plurality of candidate connection positions on the pull-out path. A candidate connection position is a candidate position for determining whether the initial position P0 can be connected to the pull-out path via a reachable path. As one of methods of setting candidate connection positions, for example, the candidate connection position setting unit 12 sets a plurality of candidate connection lines PL at predetermined intervals on the road 21 along the road orientation of the road 21, and sets the positions of intersection between the position Vo of the vehicle V and the candidate connection lines PL on the pull-out path as candidate connection positions D, and then stores the candidate connection positions D in association with the vehicle orientations Vf of the vehicle V at those positions.

Figure 5:
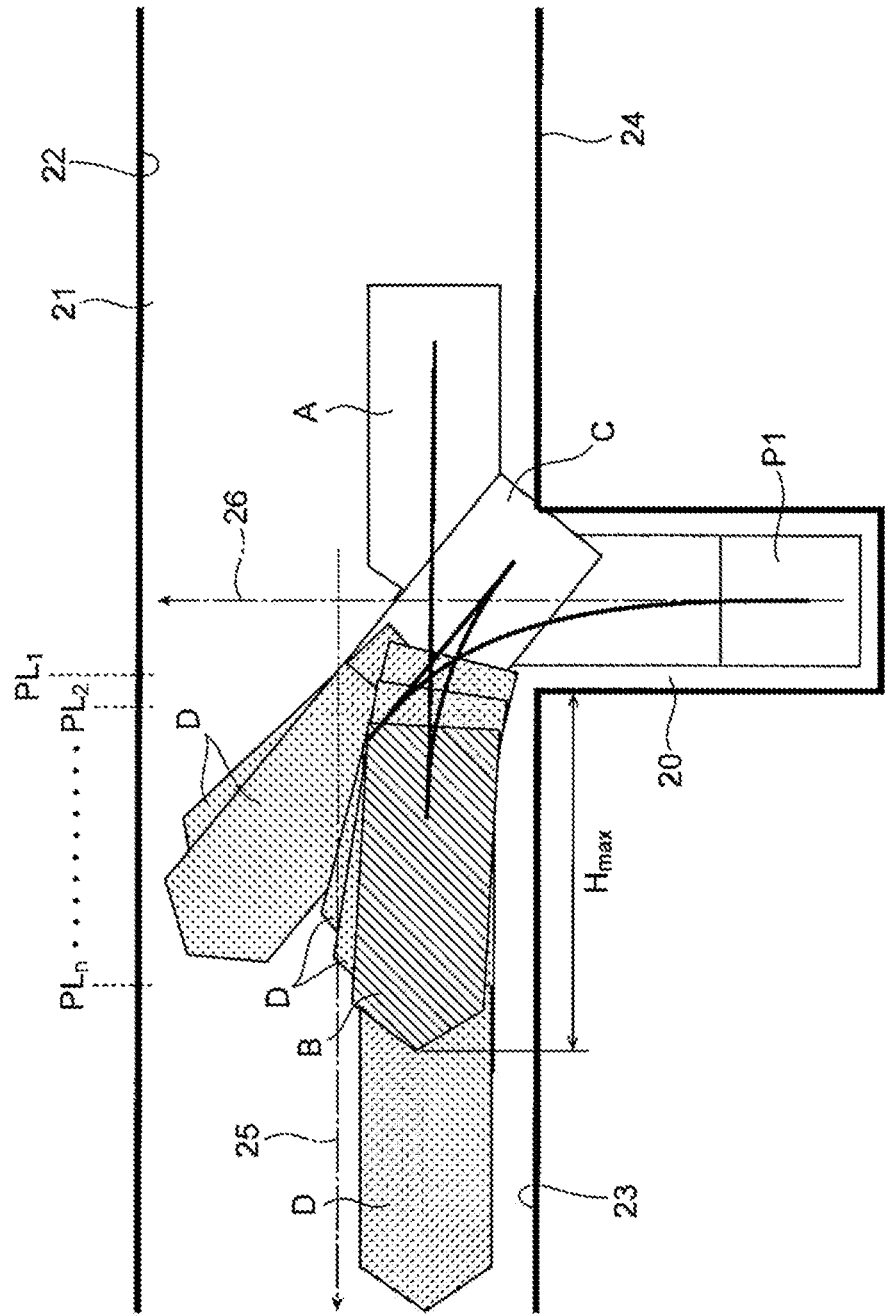
FIG. 5 illustrates candidate connection positions on a pull-out path for back-in perpendicular parking.

FIG. 5 illustrates candidate connection positions on a pull-out path for back-in perpendicular parking.

The candidate connection lines PLn (n is a number) are set such that they extend in the width direction of the road 21 at positions ahead of the target parking position P1, along the road orientation of the road 21. Specifically, the candidate connection lines PLn are set at predetermined intervals on the road 21 in the leftward direction from the parking space 20, for example, at intervals of 0.5 to 1.5 m along the lateral direction with reference to the target parking position P1 in the present embodiment. In addition, positions at which the position Vo of the vehicle V passes the candidate connection lines PL on the pull-out path are set as the candidate connection positions D, and the vehicle orientations Vf of the vehicle V at those positions are stored. It should be noted that in the drawing, symbol A denotes the initial position, symbol B denotes a park-out position, symbol P1 denotes the target parking position, and symbol C denotes the reachable limit position.

Figure 6:
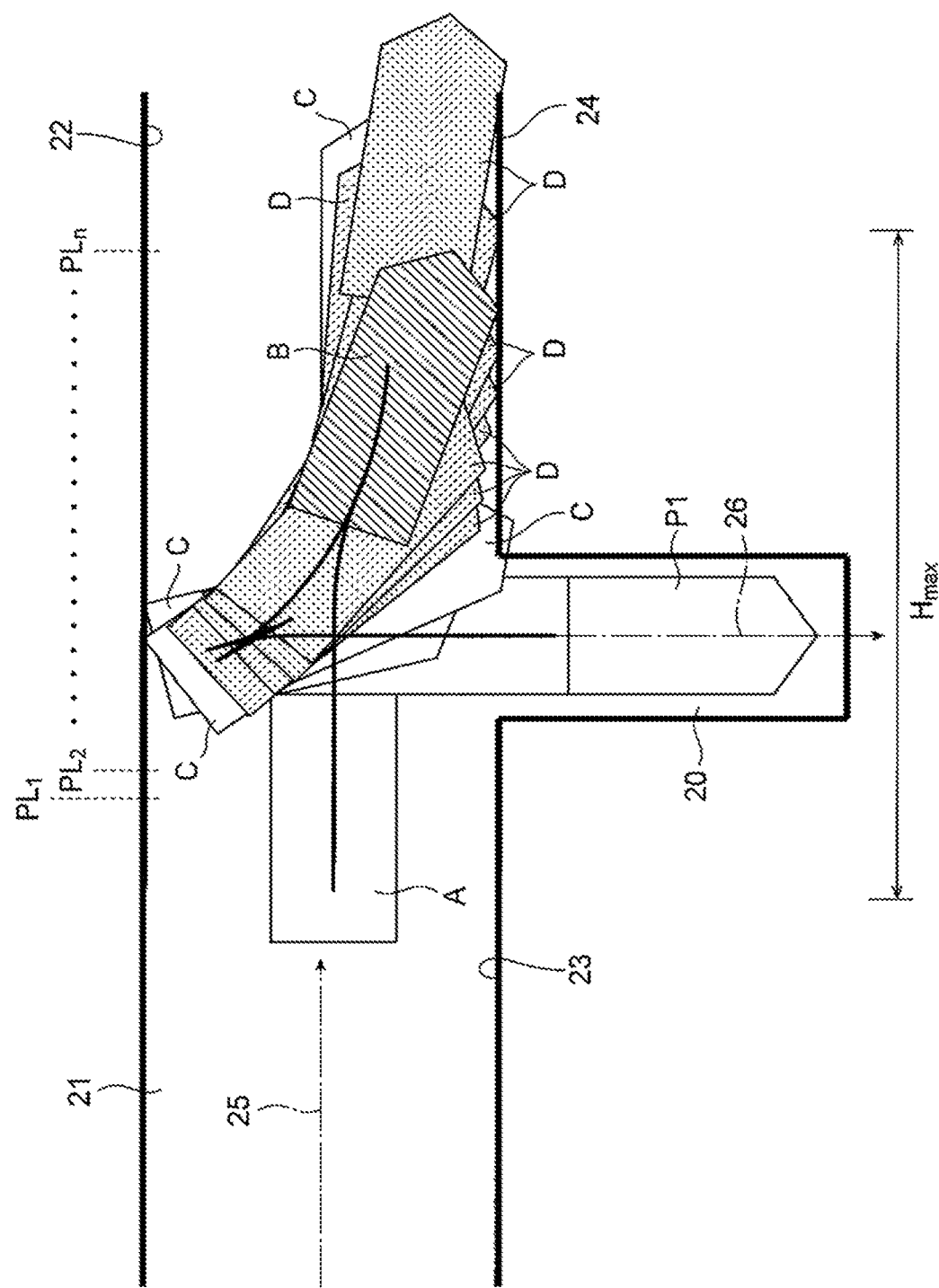
FIG. 6 illustrates candidate connection positions on a pull-out path for front-in perpendicular parking.

FIG. 6 illustrates candidate connection positions on a pull-out path for front-in perpendicular parking.

The candidate connection lines PL are set such that they extend in the width direction of the road 21 at positions ahead of the target parking position P1, along the road orientation of the road 21, for example, at intervals of 0.5 m along the road orientation 25 of the road 21 in the present embodiment. In addition, positions at which the position Vo of the vehicle V passes the candidate connection lines PL on the pull-out path are set as the candidate connection positions D, and the vehicle orientations Vf of the vehicle V at those positions are stored.

Figure 7:
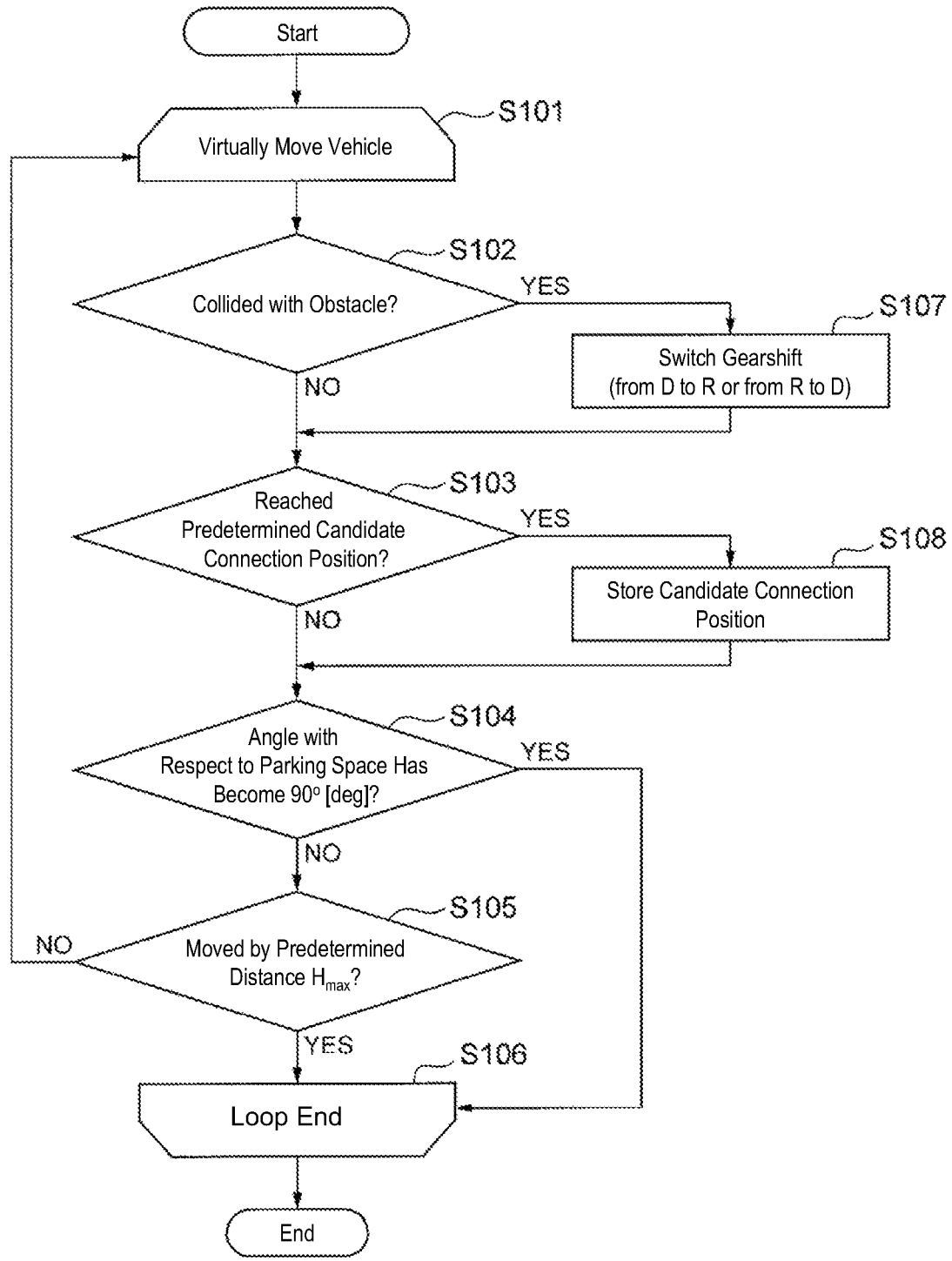
FIG. 7 is a flowchart illustrating a method of computing candidate connection positions on a pull-out path.

FIG. 7 is a flowchart illustrating a method of computing candidate connection positions on the pull-out path.

First, computation for virtually moving the vehicle V in the direction to leave the target parking position P1 is performed according to a predetermined rule (S101), and whether a virtual frame of the vehicle V has collided with an obstacle is determined (S102). If the virtual frame of the vehicle V is determined to have collided with an obstacle, such position is determined as the reachable limit position C, and the gearshift of the vehicle V is switched from the D (drive) range to the R (reverse) range or from the R range to the D range so that the direction of travel of the vehicle V is switched back from forward drive to reverse drive or from reverse drive to forward drive (S107).

Then, whether the vehicle V has reached a predetermined candidate connection position D is determined (S103), and when the position Vo of the vehicle V has passed a candidate connection line PL, such position is set as the candidate connection position D, and the vehicle orientation Vf of the vehicle V at that position is stored (S108). Then, whether the vehicle V is at an angle of 90° [deg] with respect to the parking orientation 26 and the vehicle orientation Vf is in parallel with the road orientation 25 (i.e., whether the first condition is satisfied) is determined (S104), and if it is determined that the vehicle V is at an angle of 90° [deg] with respect to the parking orientation 26 and the vehicle orientation Vf is in parallel with and in the same orientation as the road orientation 25, the first condition is determined to be satisfied, and thus, the present routine terminates S106.

Meanwhile, if the vehicle orientation Vf of the vehicle V is not determined to be at an angle of 90° [deg] with respect to the parking orientation 26, whether the vehicle V has moved away from the parking space by a distance greater than or equal to a predetermined distance Hmax is determined (S105). In the present embodiment, the predetermined distance Hmax is set to 7 meters. If the vehicle V is determined to have moved by a distance greater than or equal to the predetermined distance Hmax, the second condition is determined to be satisfied, and thus, the present routine terminates S106.

As another method of setting candidate connection positions, the candidate connection position setting unit 12 may, each time the vehicle orientation Vf of the vehicle V has changed by a predetermined relative angle (for example, every 5° [deg]) when the vehicle V is moved in the direction to leave the parking space along the pull-out path, set such position as a candidate connection position. Accordingly, the position Vo of the vehicle V when the orientation Vf of the vehicle V is at an angle of 5°, 10°, ..°, ..., 90° with respect to the parking orientation 26 is each set as the candidate connection position D.

<Reachable Path Computing Unit>

The reachable path computing unit 13 computes a reachable path that allows the vehicle V to reach at least one of the plurality of candidate connection positions D from the initial position P0 of the vehicle V.

Whether the vehicle V can reach the candidate connection position D is determined on the basis of the position Vo and vehicle orientation Vf of the vehicle V. If the position Vo of the vehicle V coincides with the candidate connection position D and the vehicle orientation Vf of the vehicle V coincides with the vehicle orientation Vf of the vehicle V stored in association with the candidate connection position D through computation by the pull-out path computing unit 11, it is determined that the vehicle V can reach the candidate connection position D. Computation of the reachable path is performed on the basis of information on the vehicle position and specifications of the vehicle V. Reachable paths are sequentially computed from the side of a candidate connection position D that involves a less number of switching of the direction of vehicle travel between forward drive and reverse drive and is closer to the initial position P0 of the vehicle V, for example.

If the vehicle V can be moved from the initial position P0 and arranged in a predetermined vehicle orientation Vf at one of the candidate connection positions D, then, the vehicle V can be moved into the parking space 20 by inversely following the pull-out path. Thus, the reachable path computing unit 13 sets, among the plurality of candidate connection positions D on the pull-out path, a candidate connection position D at which the vehicle V can be arranged in a predetermined vehicle orientation Vf from the initial position P0, as a park-out position B, and computes a reachable path of from the initial position P0 to the park-out position B.

The reachable path computing unit 13 includes a forward drive start path computing unit 131 and a reverse drive start path computing unit 132. The forward drive start path computing unit 131 computes a forward drive start path for starting moving the vehicle V forward from the initial position P0 thereof to allow the vehicle V to reach at least one of the plurality of candidate connection positions, and the reverse drive start path computing unit 132 computes a reverse drive start path for starting moving the vehicle V backward from the initial position P0 thereof to allow the vehicle V to reach at least one of the plurality of candidate connection positions.

For example, when back-in perpendicular parking is assisted to allow the vehicle V to be reverse parked in the parking space 20, the forward drive start path computing unit 131 computes as the forward drive start path a path for moving the vehicle V forward from the initial position P0 to the first park-out position B1 (see FIG. 14) that is one of the plurality of candidate connection positions that can be reached from the initial position P0. The forward drive start path computed by the forward drive start path computing unit 131 includes a path that allows the vehicle V to reach the first park-out position B1 from the initial position P0 through a single-side steering maneuver or an S-turn steering maneuver.

Figure 16:
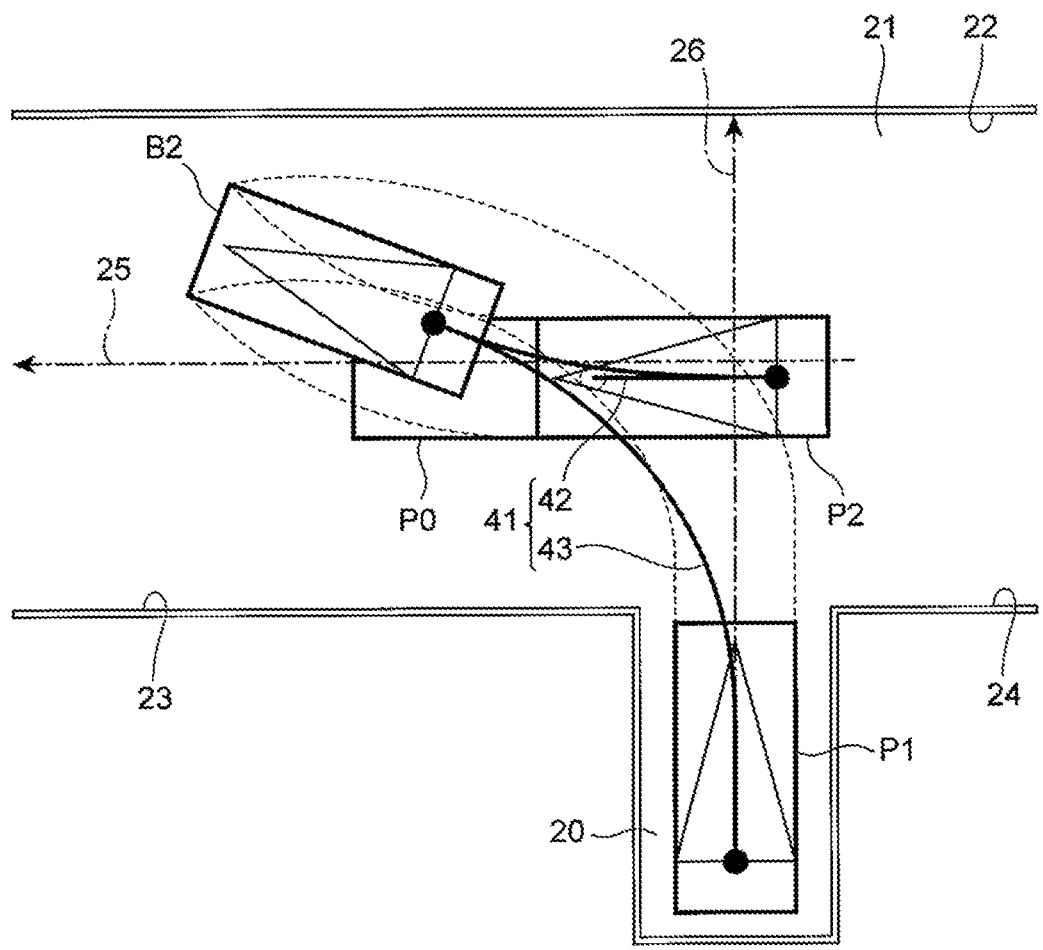
FIG. 16 illustrates a second parking path.

The reverse drive start path includes a path for moving the vehicle V backward from the initial position P0 to the back-up position P2 and then moving the vehicle V forward from the back-up position P2 to the second park-out position B2 (see FIG. 16). That is, the reverse drive start path is a path for switching the direction of vehicle travel between forward drive and reverse drive, specifically, a path for once moving the vehicle V backward from the initial position P0 to the back-up position P2 and then moving the vehicle V forward from the back-up position P2 to the second park-out position B2.

The reverse drive start path includes a path for backing up the vehicle V straight from the initial position P0 to the back-up position P2 along the vehicle orientation Vf of the vehicle V, and then allowing the vehicle V to reach the second park-out position B2 from the back-up position P2 through a single-side steering maneuver or an S-turn steering maneuver. The back-up position P2 is a position away from the initial position P0 in the backward direction by a predetermined distance or is, if a virtual frame of the vehicle V contacts an obstacle behind before the vehicle V has backed up by the predetermined distance, the position where the virtual frame of the vehicle V contacts the obstacle. The position where the virtual frame of the vehicle V contacts the obstacle is a position where the vehicle V is located opposite the obstacle with a predetermined gap therebetween. That is, the back-up position P2 is a position where the vehicle V is away from the initial position P0 thereof by the predetermined distance along the vehicle orientation Vf of the vehicle V, or a position where the vehicle V is located opposite an obstacle behind with a predetermined gap therebetween when the vehicle V is backed up.

Figure 8:
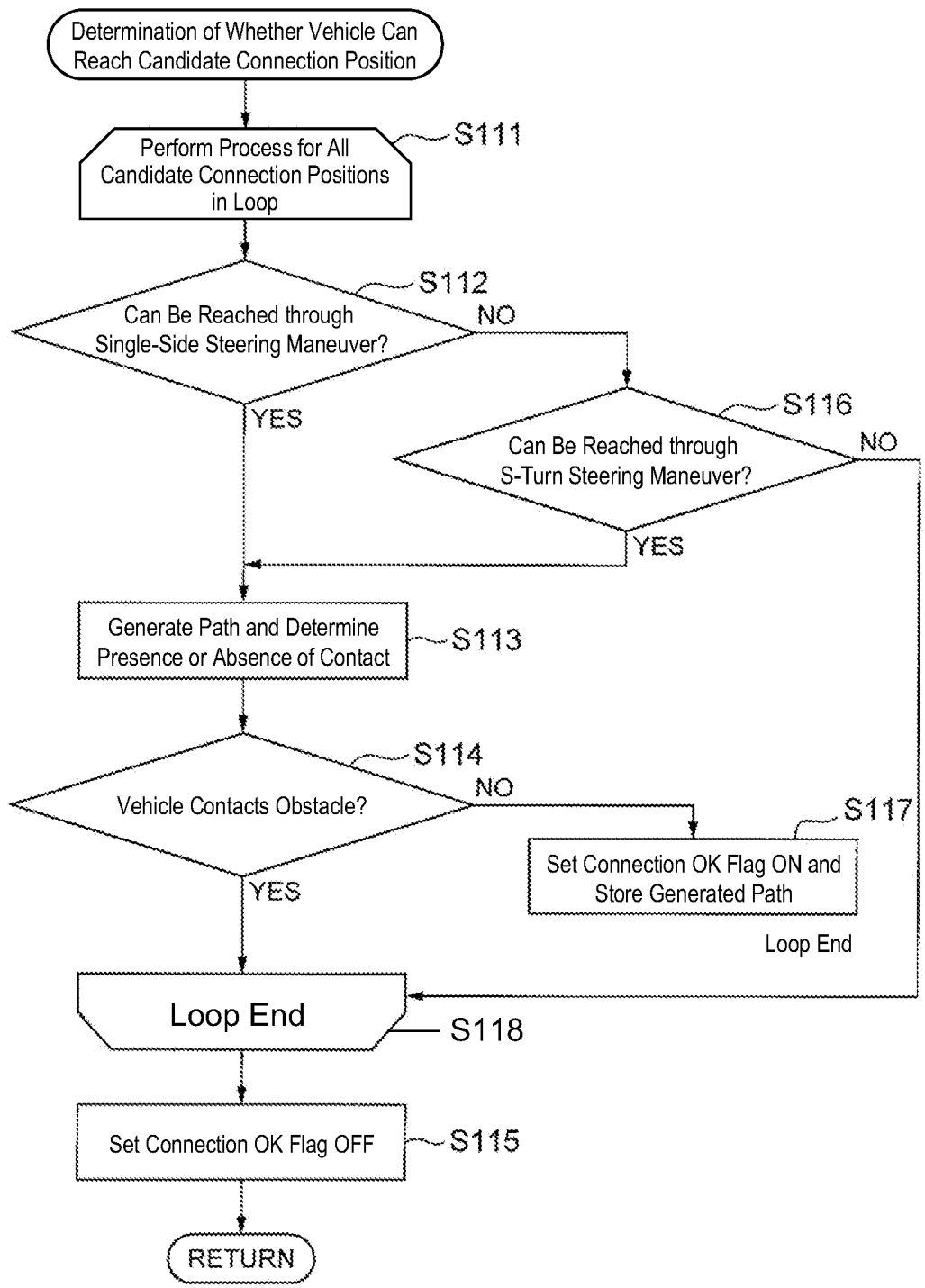
FIG. 8 is a process flow for determining whether a vehicle can reach a candidate connection position.

FIG. 8 is a process flow for determining whether the vehicle V can reach the candidate connection position D.

This process flow is performed for the total number of the candidate connection positions D in a loop (S111). First, whether the vehicle V can reach the nearest candidate connection position D from the initial position P0 through a single-side steering maneuver is determined (S112). The "single-side steering maneuver" as referred to herein is an operation of turning the steering wheel of the vehicle V to only one of the right or left side of the vehicle V. With this operation, the front wheels are turned to one of the right and left sides with respect to the vehicle orientation Vf. If it is determined that the vehicle V cannot reach the candidate connection position D through a single-side steering maneuver alone, then, whether the vehicle V can reach the candidate connection position D through an S-turn steering maneuver is determined (S116). The "S-turn steering maneuver" as referred to herein is an operation of turning the steering wheel of the vehicle V to both the right and left sides of the vehicle V With this operation, the front wheels are turned to both the right and left sides with respect to the vehicle orientation Vf.

If it is determined that the vehicle V can reach the candidate connection position D through a single-side steering maneuver or an S-turn steering maneuver, such candidate connection position D is selected as a park-out position B, and a reachable path of from the initial position P0 of the vehicle V to the park-out position B is generated (S113).

Then, whether the virtual frame of the vehicle V contacts an obstacle on the reachable path is determined (S114). If it is determined that the virtual frame of the vehicle V does not contact the obstacle, the connection OK flag is set ON and the generated reachable path is stored in a storage, and thus, the loop terminates (S117). Meanwhile, if it is determined that the vehicle V cannot reach the candidate connection position D through a single-side steering maneuver or an S-turn steering maneuver (NO in S112 and S116), or if it is determined that the virtual frame of the vehicle V contacts the obstacle (YES in S114), the determination for the relevant candidate connection position D terminates, S118 and determination for the other remaining candidate connection positions D is performed. Then, if it is determined that the vehicle V cannot reach any of the candidate connection positions D, the connection OK flag is set OFF (S115), and the process flow terminates.

Figure 9A:
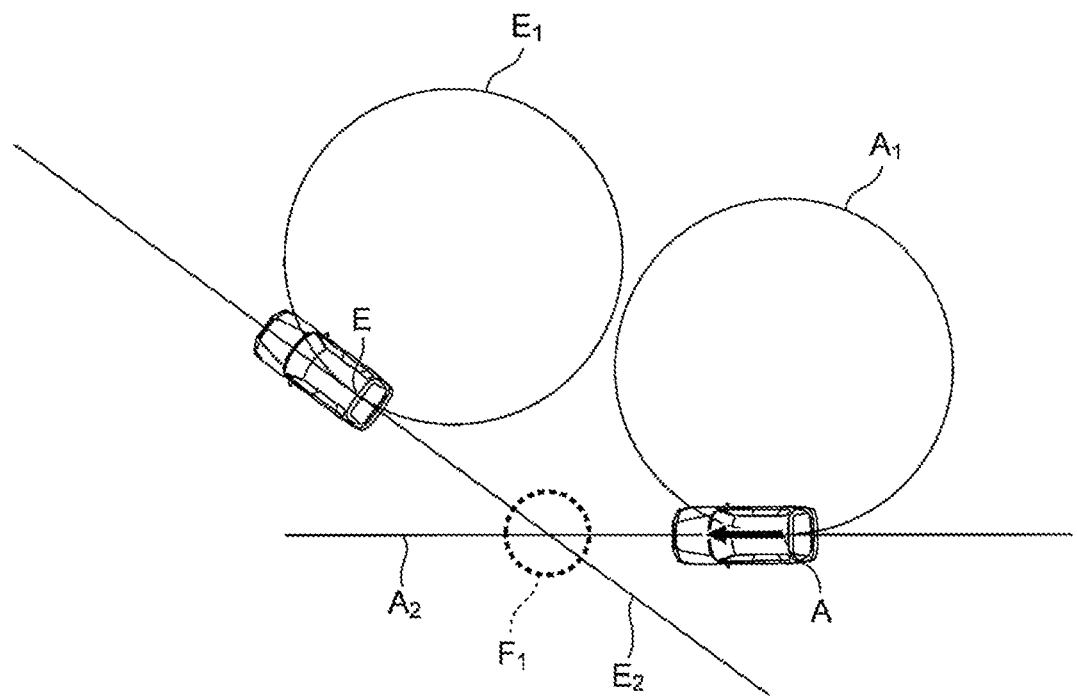
FIG. 9A illustrates an example of determination of whether the vehicle can reach the candidate connection position through a single-side steering maneuver.
Figure 9B:
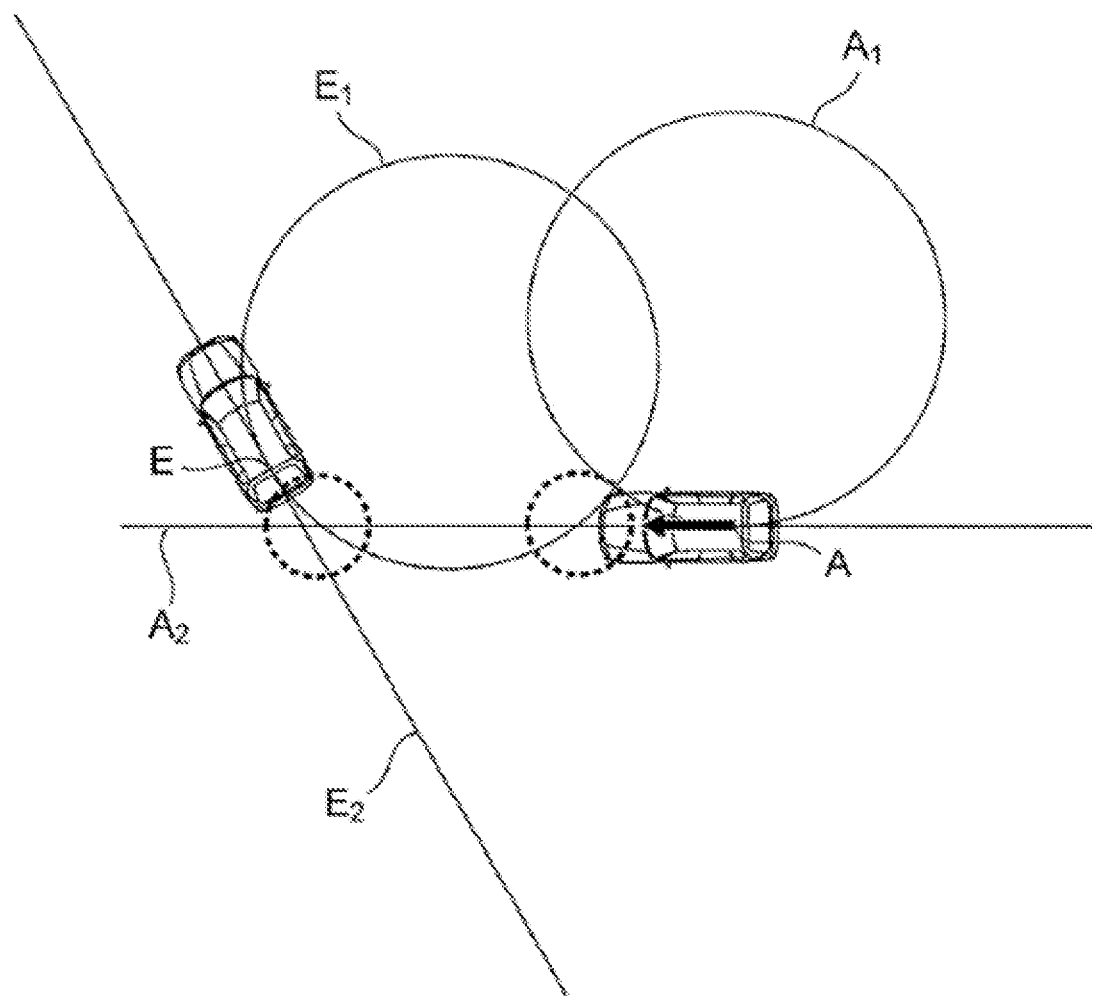
FIG. 9B illustrates an example of determination of whether the vehicle can reach the candidate connection position through a single-side steering maneuver.
Figure 9C:
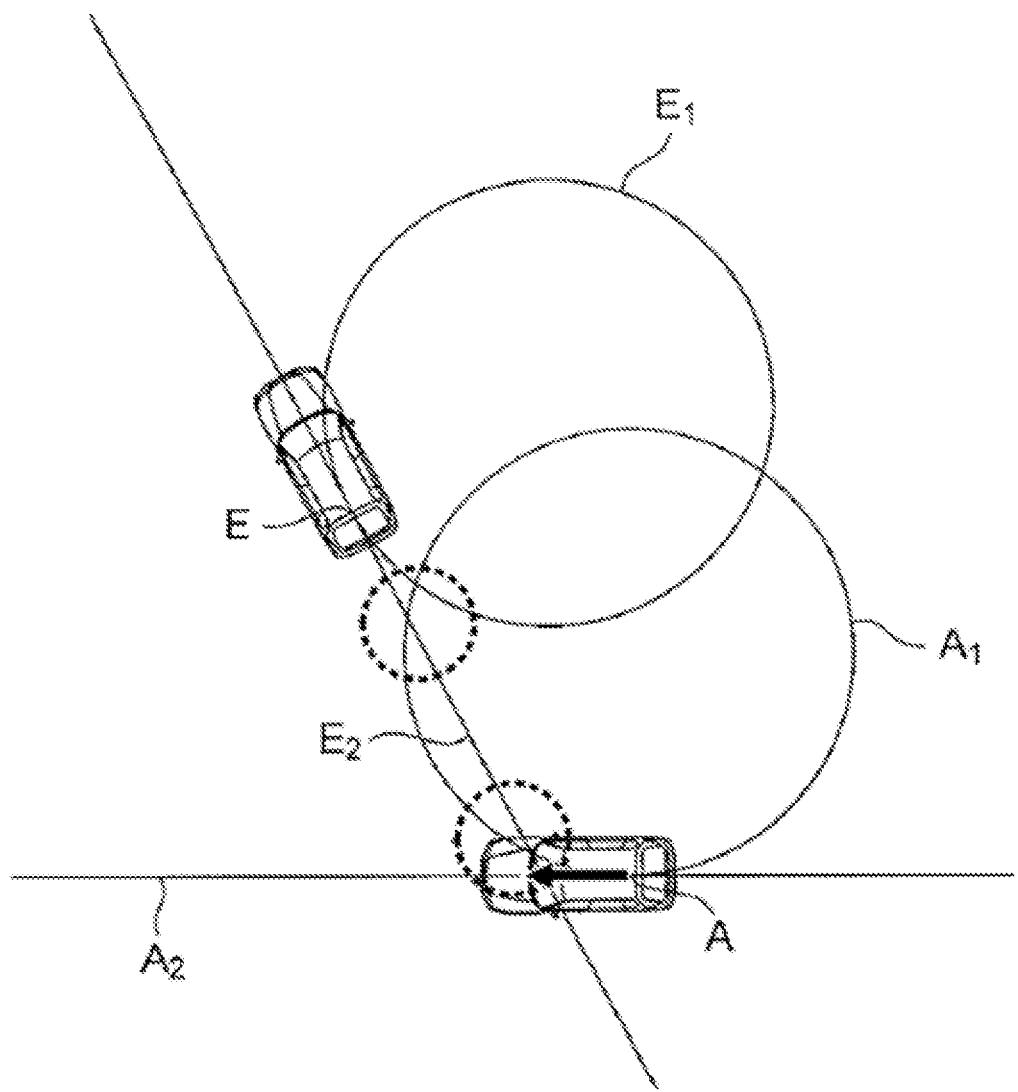
FIG. 9C illustrates an example of determination of whether the vehicle can reach the candidate connection position through a single-side steering maneuver.
Figure 9D:
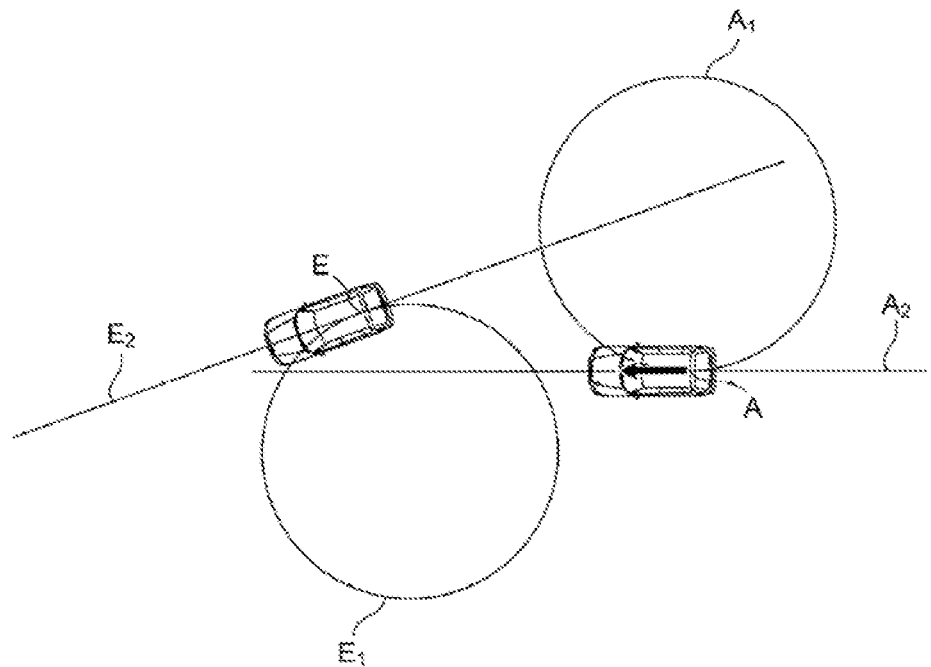
FIG. 9D illustrates an example of determination of whether the vehicle can reach the candidate connection position through an S-turn steering maneuver.
Figure 9E:
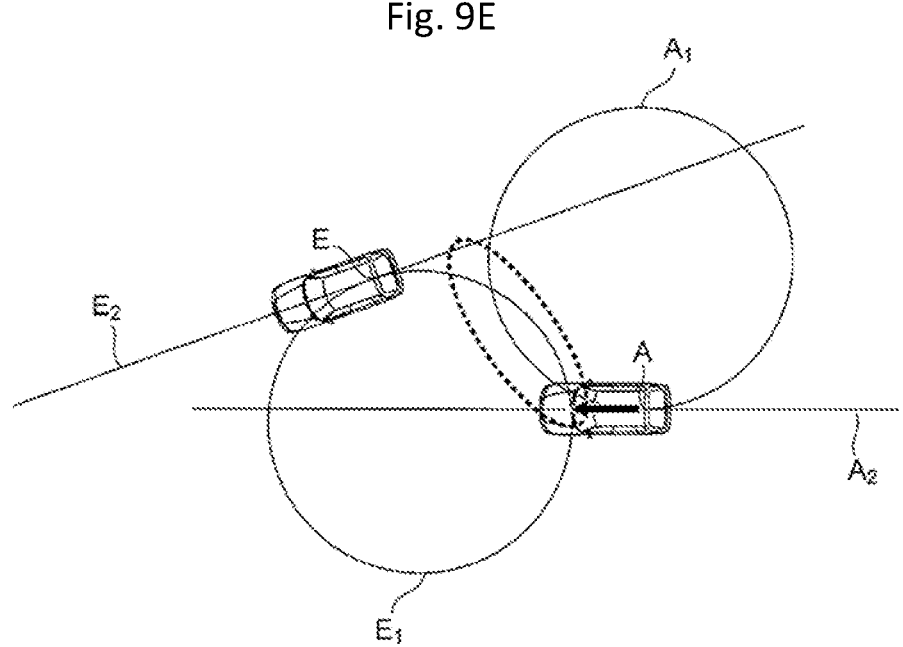
FIG. 9E illustrates an example of determination of whether the vehicle can reach the candidate connection position through an S-turn steering maneuver.

FIGS. 9A to 9C each illustrate an example of determination of whether the vehicle V can reach a candidate connection position through a single-side steering maneuver. FIGS. 9D and 9E each illustrate an example of determination of whether the vehicle V can reach a candidate connection position through an S-turn steering maneuver.

In the determination of whether the vehicle V can reach a candidate connection position through a single-side steering maneuver in S112, it is determined that the vehicle V can reach the candidate connection position if all of the following conditions (a1) to (a3) are satisfied (i.e., restrictions regarding the angular difference and positions are also imposed).

(a1) An axis A2 (vehicle orientation Vf) of the vehicle V at the current position A (i.e., initial position P0) intersects an axis E2 (vehicle orientation Vf) of the vehicle V at a candidate connection position E.

(a2) A turning circle A1 at the current position A does not intersect the axis E2 at the candidate connection position E.

(a3) A turning circle E1 at the candidate connection position E does not intersect the axis A2 at the current position A.

It should be noted that a "turning circle" herein means an arc on the turning side with the clothoid curve taken into consideration (i.e., minimum turning trajectory).

In the example illustrated in FIG. 9A, the aforementioned condition (a1) is satisfied since the axes A2 and E2 intersect at a position of intersection F1. In addition, the aforementioned conditions (a2) and (a3) are also satisfied. Therefore, it is determined that the vehicle V can reach the candidate connection position through a single-side steering maneuver. Meanwhile, in FIG. 9B, the aforementioned condition (a3) is not satisfied since the turning circle E1 intersects the axis A2. In addition, in the example illustrated in FIG. 9C, the aforementioned condition (a2) is not satisfied since the turning circle A1 intersects the axis E2. Therefore, in the example illustrated in FIGS. 9B and 9C, it is determined that the vehicle V cannot reach the candidate connection position through a single-side steering maneuver, and the process proceeds to determination of whether an S-turn steering maneuver is available.

In the determination of whether the vehicle V can reach the candidate connection position through an S-turn steering maneuver in S116, it is determined that the vehicle V can reach the candidate connection position if the following condition (a4) is satisfied (i.e., restrictions regarding the angular difference and positions are also imposed).

(a4) The turning circle A1 at the current position A and the turning circle E1 at the candidate connection position E do not intersect.

In the example illustrated in FIG. 9D, the aforementioned condition (a4) is satisfied since the turning circle A1 and the turning circle E1 do not intersect. Therefore, it is determined that the vehicle V can reach the candidate connection position through an S-turn steering maneuver. Meanwhile, in the example illustrated in FIG. 9E, the aforementioned condition (a4) is not satisfied since the turning circle A1 and the turning circle E1 intersect. Therefore, it is determined that the vehicle V cannot reach the candidate connection position through an S-turn steering maneuver.

Figure 10:
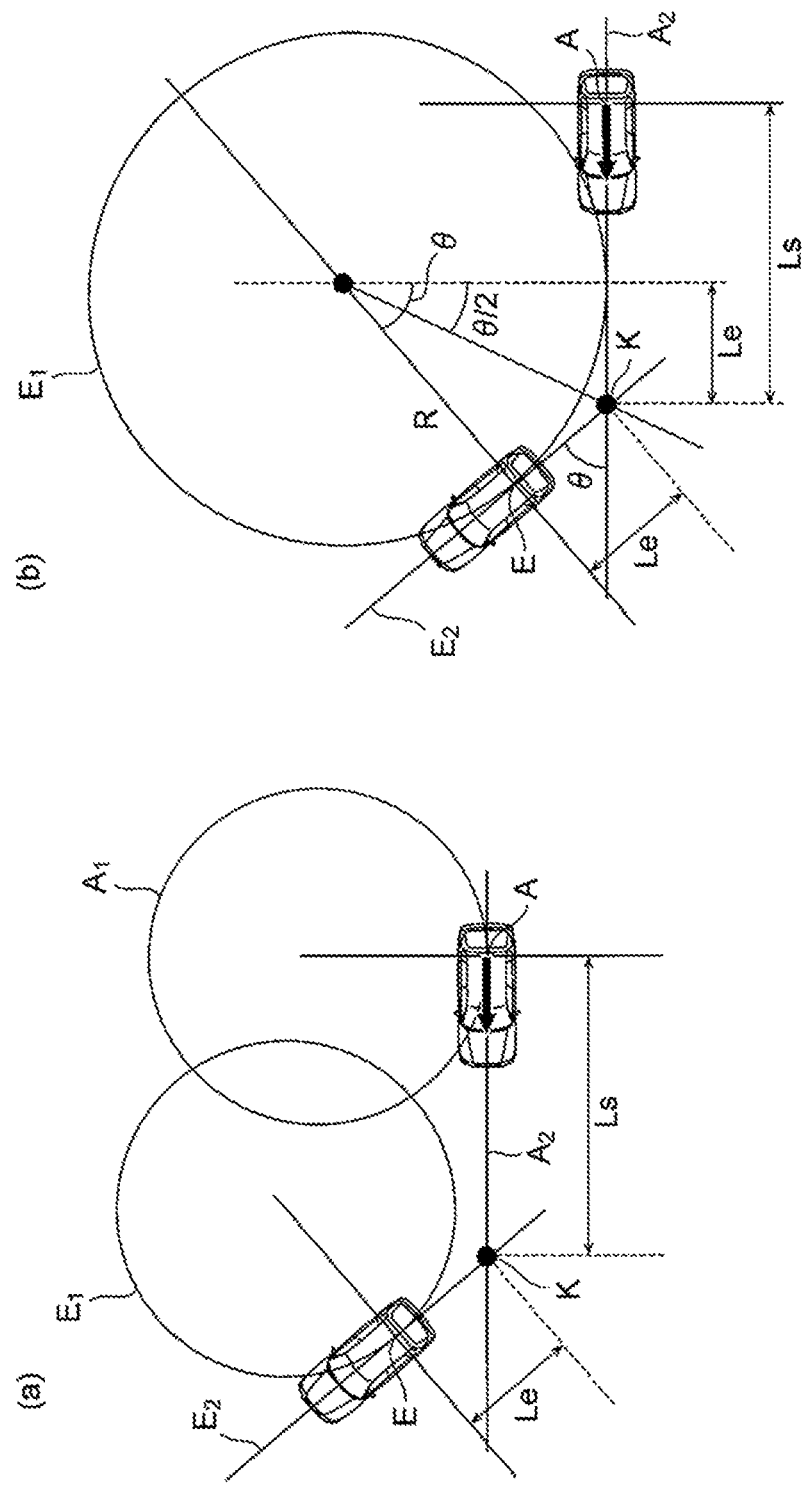
FIG. 10 illustrate a method of generating a reachable path that requires only a single-side steering maneuver.

FIG. 10(a), 10(b) illustrate a method of generating a reachable path that requires only a single-side steering maneuver. To generate a reachable path of from the current position A to the candidate connection position E that requires only a single-side steering maneuver, first, as illustrated in FIG. 10(a), the distance Ls between the intersection K between the axis A2 and the axis E2 and the current position A, and the distance Le between the intersection K and the candidate connection position E are computed, and the shorter distance is selected (i.e., the distance Le is selected in the example illustrated in the drawing). Then, as illustrated in FIG. 10(b), a circle having both the two axes A2 and E2 as tangents and passing through a point that is away from the intersection K by the shorter distance is depicted, and the radius R of the circle is computed through geometric computation using Formula (1) below.

[Formula 1]

$$R = \frac{L_e}{\tan\frac{\theta}{2}} \quad (1)$$

This can generate a reachable path that combines a straight line and an arc.

Figure 11:
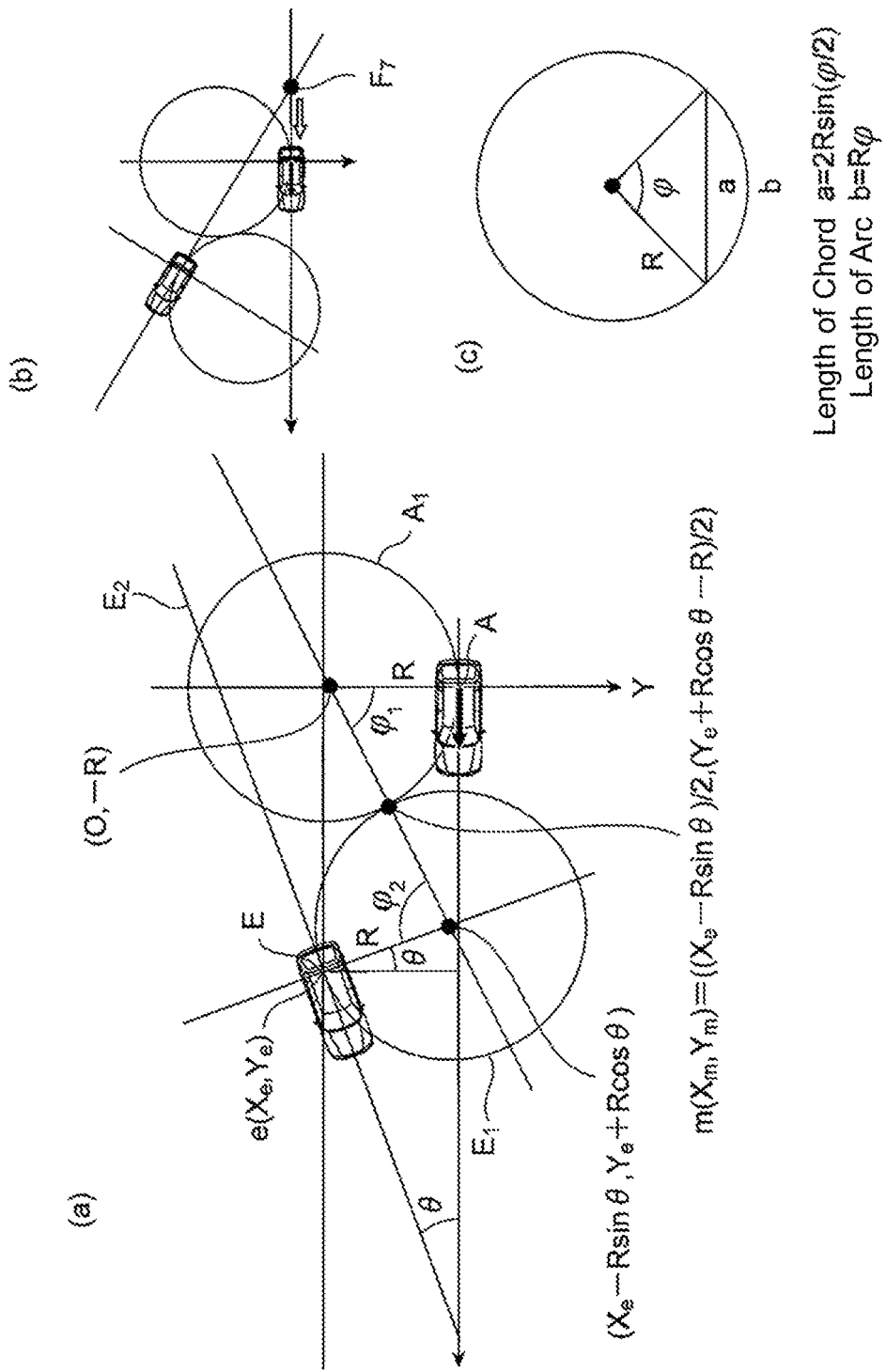
FIG. 11 illustrate a method of generating a reachable path that requires an S-turn steering maneuver.

FIG. 11 illustrate a method of generating a reachable path that requires an S-turn steering maneuver, and illustrate a generation method when the axis E2 does not intersect the X-axis, which is the axis A2 at the current position A, at a position behind the candidate connection position E.

Herein, the radii R, which are identical, of the two turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 2]

$$2R = \sqrt{(X_e - R\sin\theta)^2 + (Y_e + R\cos\theta + R)^2} \quad (2)$$

[Formula 3]

$$R = \frac{X_e\sin\theta - Y_e(1+\cos\theta) - \sqrt{\{X_e\sin\theta - Y_e(1+\cos\theta)\}^2 - 2(\cos\theta - 1)(X_e^2 + Y_e^2)}}{2(\cos\theta - 1)} \quad (3)$$

It should be noted that when θ=0,

[Formula 4]

$$R = -\frac{X_e^2 + Y_e^2}{4Y_e} \quad (4)$$

The position of the intersection illustrated in FIG. 11(a) to the position of the intersection F7 illustrated in FIG. 11(b) can be computed from the aforementioned computational formulae.

From the formulae shown in FIG. 11(c), the turning angles $\phi_1$ and $\phi_2$ and the arc lengths $b_1$ and $b_2$ of the two circle of the S-shape be determined using the following computational formulae.

[Formula 5]
$$\varphi_1 = 2\sin^{-1}\left(\frac{\sqrt{X_m^2 + Y_m^2}}{2R}\right) \quad (5)$$

[Formula 6]
$$b_1 = 2R\sin^{-1}\left(\frac{\sqrt{X_m^2 + Y_m^2}}{2R}\right) \quad (6)$$

[Formula 7]
$$\varphi_2 = 2\sin^{-1}\left(\frac{\sqrt{(X_m - X_e)^2 + (Y_m - Y_e)^2}}{2R}\right) \quad (7)$$

[Formula 8]
$$b_2 = 2R\sin^{-1}\left(\frac{\sqrt{(X_m - X_e)^2 + (Y_m - Y_e)^2}}{2R}\right) \quad (8)$$

Figure 12:
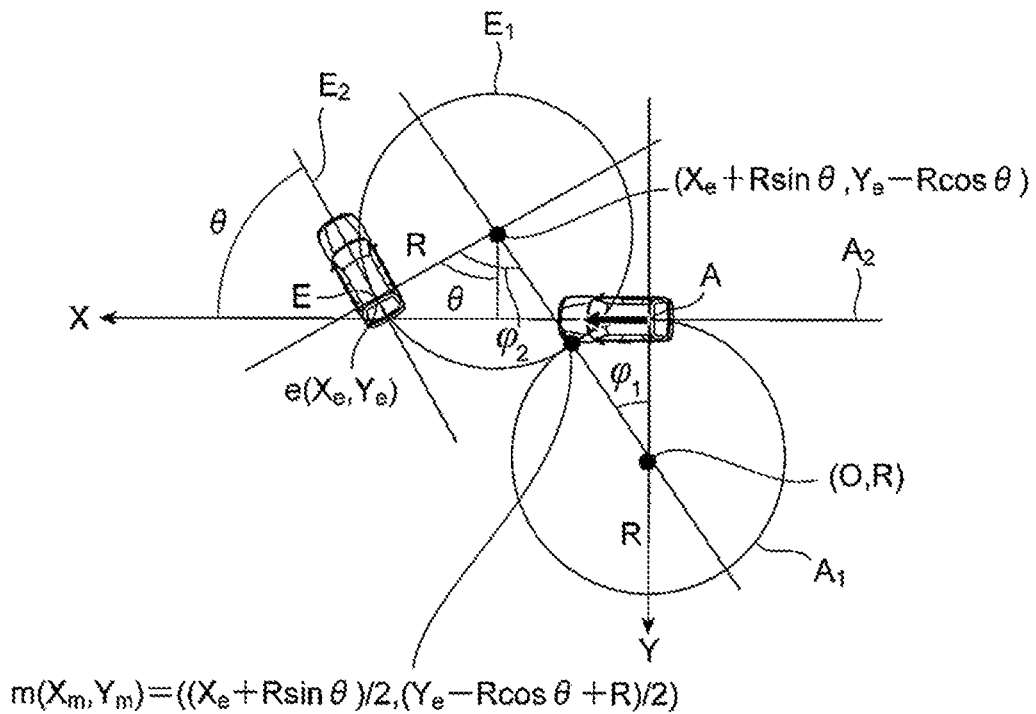
FIG. 12 illustrates a method of generating a reachable path that requires an S-turn steering maneuver.

FIG. 12 illustrates an exemplary method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 9]
$$2R = \sqrt{(X_e + R\sin\theta)^2 + (Y_e - R\cos\theta - R)^2} \quad (9)$$

[Formula 10]
$$R = \frac{-\{X_e\sin\theta - Y_e(1 + \cos\theta)\} - \sqrt{\{X_e\sin\theta - Y_e(1 + \cos\theta)\}^2 + 2(\cos\theta - 1)(X_e^2 + Y_e^2)}}{2(\cos\theta - 1)} \quad (10)$$

From the formulae shown in FIG. 11(c), the turning angles $\phi_1$ and $\phi_2$ and the arc lengths $b_1$ and $b_2$ of the two circles of the S-shape can be determined using the following computational formulae.

[Formula 11]
$$\varphi_1 = 2\sin^{-1}\left(\frac{\sqrt{X_m^2 + Y_m^2}}{2R}\right) \quad (11)$$

[Formula 12]
$$b_1 = 2R\sin^{-1}\left(\frac{\sqrt{X_m^2 + Y_m^2}}{2R}\right) \quad (12)$$

[Formula 13]
$$\varphi_2 = 2\sin^{-1}\left(\frac{\sqrt{(X_m - X_e)^2 + (Y_m - Y_e)^2}}{2R}\right) \quad (13)$$

[Formula 14]
$$b_2 = 2R\sin^{-1}\left(\frac{\sqrt{(X_m - X_e)^2 + (Y_m - Y_e)^2}}{2R}\right) \quad (14)$$

Figure 13:
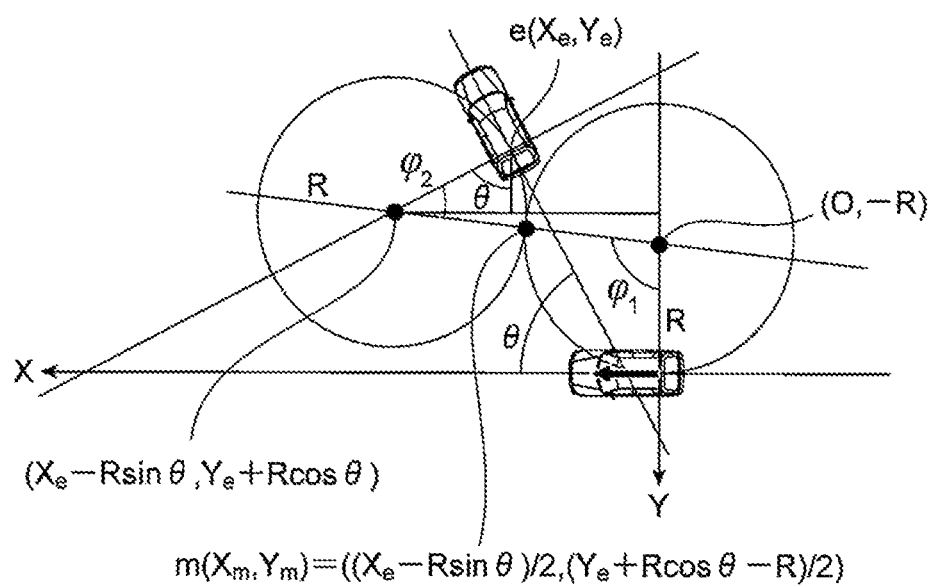
FIG. 13 illustrates a method of generating a reachable path that requires an S-turn steering maneuver.

FIG. 13 illustrates a method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, the radius of each of the two circles can be determined from the distance between the center coordinates.

[Formula 15]
$$2R = \sqrt{(X_e - R\sin\theta)^2 + (Y_e + R\cos\theta + R)^2} \quad (15)$$

[Formula 16]
$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (16)$$

From the formulae shown in FIG. 11(c), the turning angles $\phi_1$ and $\phi_2$ and the arc lengths $b_1$ and $b_2$ of the two circles of the S-shape can be determined using the following computational formulae.

[Formula 17]
$$\varphi_1 = 2\sin^{-1}\left(\frac{\sqrt{X_m^2 + Y_m^2}}{2R}\right) \quad (17)$$

[Formula 18]
$$b_1 = 2R\sin^{-1}\left(\frac{\sqrt{X_m^2 + Y_m^2}}{2R}\right) \quad (18)$$

[Formula 19]
$$\varphi_2 = 2\sin^{-1}\left(\frac{\sqrt{(X_m - X_e)^2 + (Y_m - Y_e)^2}}{2R}\right) \quad (19)$$

[Formula 20]
$$b_2 = 2R\sin^{-1}\left(\frac{\sqrt{(X_m - X_e)^2 + (Y_m - Y_e)^2}}{2R}\right) \quad (20)$$

<Parking Path Computing Unit>

The parking path computing unit 14 computes a parking path using information on the pull-out path of from the target parking position P1 in the parking space 20 to the park-out position B and information on the reachable path of from the initial position P0 of the vehicle V to the park-out position B. The parking path computing unit 14 computes a parking path by connecting the reachable path, which has been generated by setting the connection OK flag ON in step S117 of FIG. 10, and the pull-out path including the park-out position B connecting to the reachable path. The parking path includes a path for moving the vehicle V from the initial position P0 to the park-out position B along the reachable path, and a path for moving the vehicle V in the inverse direction to the pull-out path of from the target parking position P1 to the park-out position B.

As described above, the parking assistance device 1 computes a pull-out path from the target parking position P1, and selects, from among a plurality of candidate connection positions D set on the pull-out path, a candidate connection position D that can be reached by the vehicle at the initial position P0 and is closest to the initial position P0 as the park-out position B, and then sets a parking path using the pull-out path of from the target parking position P1 to the park-out position B and the reachable path of from the initial position P0 of the vehicle V to the park-out position B. Therefore, a parking path that includes switching of the direction of vehicle travel for guiding the vehicle V to the target parking position P1 is computed independently of the start position or vehicle attitude when parking assistance is started, and the vehicle V can be parked at the position intended by the driver and in a correct vehicle attitude.

The parking path computing unit 14 includes a first parking path computing unit 141 and a second parking path computing unit 142. The first parking path computing unit 141 computes the first parking path by connecting the forward drive start path and the pull-out path at the first park-out position B1, and the second parking path computing unit 142 computes the second parking path by connecting the reverse drive start path and the pull-out path at the second park-out position B2.

Figure 14:
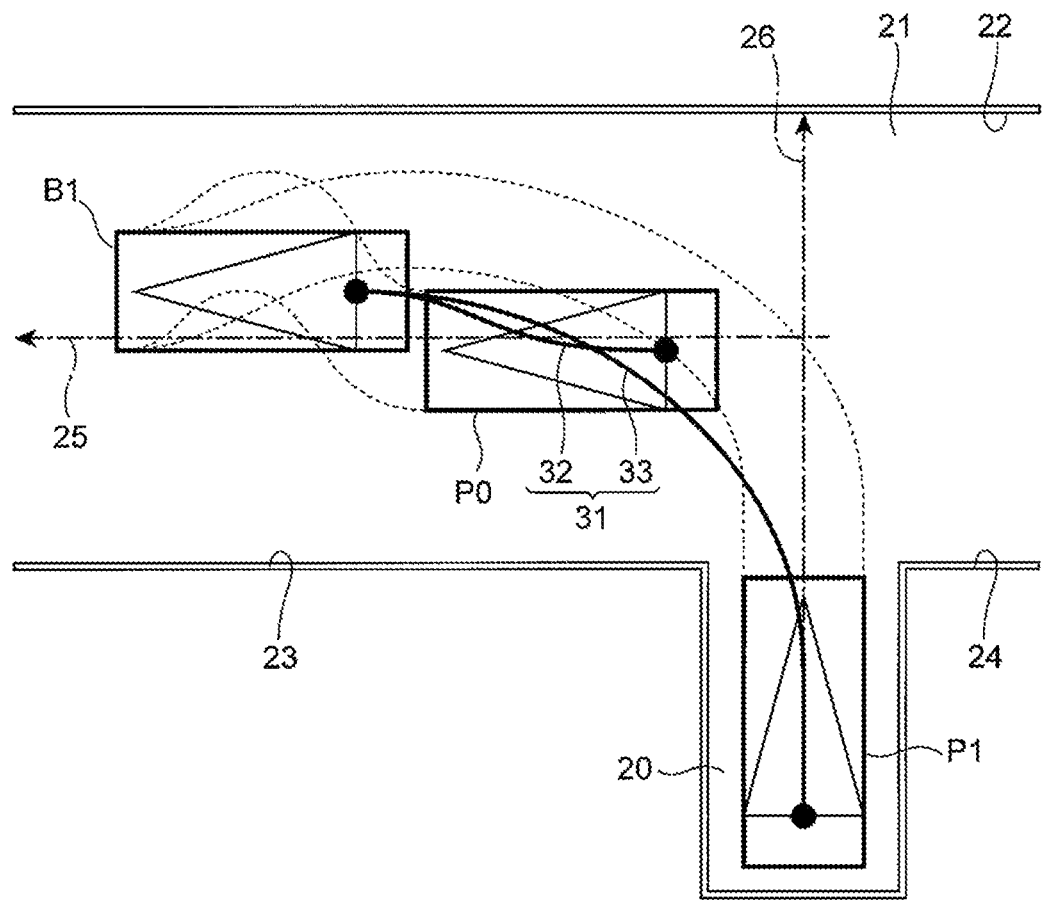
FIG. 14 illustrates a first parking path.
Figure 15:
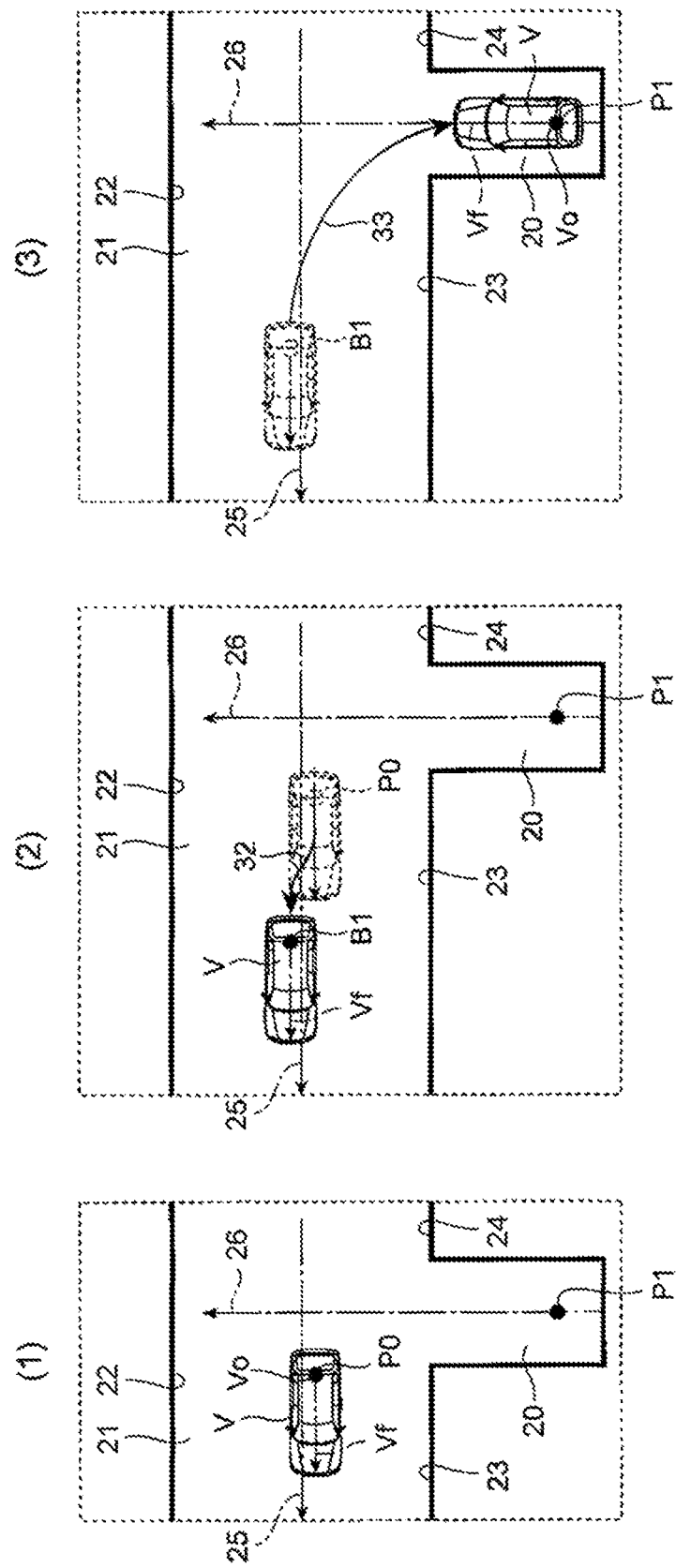
FIG. 15 illustrate a movement of the vehicle along the first parking path.
Figure 17:
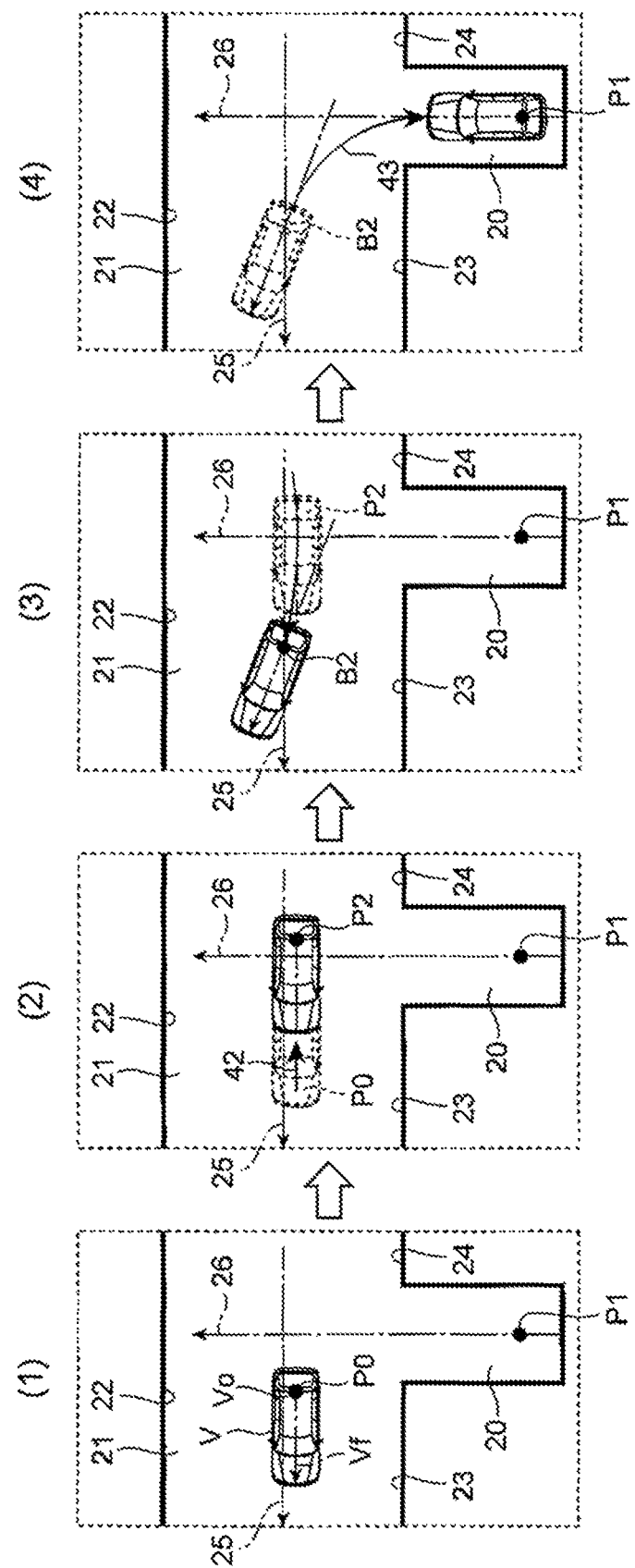
FIG. 17 illustrate a movement of the vehicle along the second parking path.

FIG. 14 illustrates the first parking path, and FIG. 15 illustrate a movement of the vehicle V along the first parking path. FIG. 16 illustrates the second parking path, and FIG. 17 illustrate a movement of the vehicle V along the second parking path. Each of the examples illustrated in FIGS. 14 to 16 is a case where the initial position P0 of the vehicle V with respect to the parking space 20 is the same, and the vehicle V is located along the road orientation 25 at a position ahead of the parking space 20, that is, located at a position past the parking space 20.

The first parking path 31 is a path for starting moving the vehicle V forward from the initial position P0 thereof, and includes a path 32 for moving the vehicle V forward from the initial position P0 to the first park-out position B1, and a path 33 for backing up the vehicle V from the first park-out position BI to the target parking position P1. The path 32 is a forward drive start path computed by the forward drive start path computing unit 131, and is a path that requires an S-turn steering maneuver in the example illustrated in FIG. 14. In addition, the path 33 is a path for moving the vehicle V in the inverse direction to the pull-out path of from the target parking position P1 to the second park-out position B2, and is a path that requires only a single-side steering maneuver in the example illustrated in FIG. 14. The vehicle V is guided along the first parking path 31; specifically, the vehicle V starts moving forward from the initial position P0 (FIG. 15(1)), reaches the first park-out position B1 through an S-turn steering maneuver (FIG. 15(2)), backs up from the first park-out position B1 to the target parking position P1 through a single-side steering maneuver, and thus can be parked at the target parking position P1 (FIG. 15(3)).

The second parking path 41 is a path for starting moving the vehicle V backward from the initial position P0 thereof, and includes a path 42 for backing up the vehicle V from the initial position P0 to the back-up position P2 and then switching the direction of vehicle travel from reverse drive to forward drive at the back-up position P2 so as to move the vehicle V forward from the back-up position P2 to the second park-out position B2, and a path 43 for backing up the vehicle V from the second park-out position B2 to the target parking position P1. The path 42 is a reverse drive start path computed by the reverse drive start path computing unit 132 and is, in the example illustrated in FIG. 16, a path for backing up the vehicle V straight along the vehicle orientation Vf up to the back-up position P2 that is away from the initial position P0 in the backward direction by a predetermined distance, and then allowing the vehicle V to reach the second park-out position B2 from the back-up position P2 through a single-side steering maneuver. In addition, the path 43 is a path for moving the vehicle V in the inverse direction to the pull-out path of from the target parking position P1 to the second park-out position B2, and is a path that requires only a single-side steering maneuver in the example illustrated in FIG. 16.

The vehicle V is guided along the second parking path 41; specifically, the vehicle V starts backing up from the initial position P0 (FIG. 17(1)), switches its direction of travel from reverse drive to forward drive at the back-up position P2 so as to move forward (FIG. 17(2)), reaches the second park-out position B2 through a single-side steering maneuver (FIG. 17(3)), backs up from the second park-out position B2 to the target parking position P1 through a single-side steering maneuver, and thus can be parked at the target parking position P1 (FIG. 17(4)).

The second parking path 41 involves a shorter movement distance for the vehicle V in the direction along the road orientation 25 of the road 21 in comparison with the first parking path 31 and is a relatively compact path. Therefore, the path can be within the sensing range of an external recognition sensor of the vehicle V or a range determined according to the sensing range. For example, when a path along which the vehicle V is moved beyond the sensing range is used, there is a possibility that an obstacle that has not been detected will be detected while the vehicle is moved along the parking path, and in such a case, the guidance will stop. In contrast, when a path along which the vehicle V is moved within the sensing range is used, there is little possibility that an obstacle that has not been detected will be detected while the vehicle V is moved along the parking path. Thus, the vehicle V can be guided to the parking space 20.

<Path Selection Unit>

If both the first parking path 31 and the second parking path 41 can be computed, the path selection unit 15 selects one of the first parking path 31 or the second parking path 41, and sets the selected path as the parking path to be used. If only one of the first parking path 31 or the second parking path 41 can be computed, the path that can be computed is set as the parking path to be used. The parking path is selected on the basis of an evaluation function. The evaluation function is a function that serves as a criterion for selecting one of the first parking path 31 or the second parking path 41 that is suitable for given circumstances or user's needs, and is set in advance.

The evaluation function includes at least one of the (1) movement time, (2) sensing range, or (3) distance. The (1) movement time is a time that is predicted to be necessary for moving the vehicle V from the initial position P0 to the target parking position P1 along the parking path. The (2) sensing range is the sensing range of an external recognition sensor of the vehicle V, or a range determined according to the sensing range. The (3) distance is the separation distance between the initial position P0 and the target parking position P1.

For example, when the vehicle V is parked, the time needed for parking can be shortened as the number of switching of the direction of vehicle travel between forward drive and reverse drive as well as the number of steering maneuvers is smaller. Therefore, to shorten the time needed for parking, an evaluation function is set that selects a parking path requiring a less number of switching of the direction of vehicle travel between forward drive and reverse drive as well as less steering maneuvers as much as possible.

In addition, when the vehicle V is parked, using a parking path that is within the sensing range or a range determined according to the sensing range can reduce the possibility that an obstacle that has not been detected will be detected on the path, which would otherwise result in a guidance error. Therefore, in a circumstance in which many obstacles are present, an evaluation function that selects a compact parking path is set.

In addition, the accuracy of the parking position is higher when the vehicle V moves straight into the parking space 20 after the orientation of the vehicle V has been aligned with the parking orientation 26 than when the vehicle enters the parking space 20 while turning. Therefore, when the accuracy of the parking position is prioritized, an evaluation function is set that selects a parking path for allowing the vehicle V to move straight into the parking space 20 after the orientation of the vehicle V has been aligned with the parking orientation 26.

Further, when parking the vehicle V, the driver's intention to park the vehicle V in the parking space 20 can be more clearly conveyed to another vehicle behind the vehicle V when the vehicle V is at a position closer to the parking space 20 than when the vehicle V moves to a position away from the parking space 20. Thus, it is possible to avoid another vehicle behind from getting parked in the target parking space 20 earlier than the vehicle V. Therefore, when there is another vehicle behind the vehicle V on the road 21, an evaluation function is set that selects a parking path for allowing the vehicle V to be closer to the parking space 20, though it requires more switching of the direction of vehicle travel and more changes in steering maneuvers.

Specifically, an evaluation function is set that selects the second parking path 41 having the reverse drive start path 42 when the initial position P0 of the vehicle V is located along the road orientation 25 at a position ahead of the parking space 20, and selects the first parking path 31 having the forward drive start path 32 when the initial position P0 of the vehicle V is located along the road orientation 25 at a position behind the parking space 20.

For example, if the first parking path 31 having the forward drive start path 32 is selected when the initial position P0 of the vehicle V is located along the road orientation 25 at a position ahead of the parking space 20, the first park-out position B1 will be set at a position far away from the parking space 20. Thus, the driver may feel uneasy, and the driver's intention to park the vehicle V in the parking space 20 may become less easily conveyed to another vehicle behind so that the vehicle behind may get parked in the parking space 20 earlier than the vehicle V. Therefore, when the initial position P0 of the vehicle V is located along the road orientation 25 at a position ahead of the parking space 20, an evaluation function that selects the second parking path 41 having the reverse drive start path 42 is set. When the second parking path 41 is selected, the vehicle V can be guided to the parking space 20 while being kept at positions near the parking space 20, and the driver's intention to park the vehicle V in the parking space 20 can be easily conveyed to another vehicle behind so that it is possible to avoid the vehicle behind from getting parked in the parking space 20 earlier than the vehicle V.

Meanwhile, if the second parking path 41 having the reverse drive start path 42 is selected when the initial position P0 of the vehicle V is located along the road orientation 25 at a position behind the parking space 20, the vehicle V will back up in the direction away from the parking space 20 and the driver may feel uneasy. Therefore, when the initial position. P0 of the vehicle V is located along the road orientation 25 at a position behind the parking space 20, an evaluation function that selects the first parking path 31 having the forward drive start path 32 is set. When the first parking path 31 is selected, the vehicle V can be guided to the parking space 20 while being kept at positions near the parking space 20 and the driver will not feel uneasy.

Although the embodiments of the present invention have been described in detail above, the present invention is not limited thereto, and various design changes can be made without departing from the spirit or scope of the present invention recited in the claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

1 Parking assistance device
11 Pull-out path computing unit
12 Candidate connection position setting unit
13 Reachable path computing unit
131 Forward Drive Start Path Computing Unit
132 Reverse Drive Start Path Computing Unit
14 Parking Path Computing Unit
141 First Parking Path Computing Unit
142 Second Parking Path Computing Unit
15 Path selection unit
16 Display unit
20 Parking space
21 Road
22, 23, 24 Obstacle
25 Road orientation
26 Parking orientation
V Vehicle
Vo Reference point (position of vehicle)
P0 Initial position
P1 Target parking position
P2 Back-up Position
B, B1, B2 Park-out position
C Reachable limit position
D Candidate connection position

The invention claimed is:
1. A parking assistance apparatus for assisting in parking a vehicle in a parking space that is provided on one side of a road, comprising:

one or more processors and one or more non-transitory computer-readable storage media, the non-transitory computer-readable storage media having stored thereon at least a parking assistance device being configured to:

compute both of a first candidate parking path for starting moving the vehicle forward from an initial position of the vehicle, and a second candidate parking path for starting moving the vehicle backward from the initial position of the vehicle, select one of the first candidate parking path or the second candidate parking path on the basis of a preset evaluation function, the evaluation function being set according to a relationship between the initial position of the vehicle and the parking position, and execute the selected path as a parking path to assist in parking the vehicle, the non-transitory computer-readable storage media further having stored thereon at least a pull-out path computing unit, a candidate connection position setting unit, a reachable path computing unit, a parking path computing unit, and a path selection unit, wherein:

the pull-out path computing unit is configured to compute a pull-out path for pulling the vehicle out of the parking space on the basis of information on the parking space and constraint conditions regarding vehicle behavior;

the candidate connection position setting unit is configured to set a plurality of candidate connection positions on the pull-out path computed by the pull-out path computing unit;

the reachable path computing unit is configured to compute both of a candidate forward drive start path for starting moving the vehicle forward from the initial position of the vehicle to allow the vehicle to reach at least one of the plurality of candidate connection positions, and a candidate reverse drive start path for starting moving the vehicle backward from the initial position of the vehicle to allow the vehicle to reach at least one of the plurality of candidate connection positions;

the parking path computing unit is configured to compute the first parking path by connecting the candidate forward drive start path and the pull-out path at a first park-out position that is one of the plurality of candidate connection positions reachable along the forward drive start path, and compute the candidate second parking path by connecting the reverse drive start path and the pull-out path at a second park-out position that is one of the plurality of candidate connection positions reachable along the reverse drive start path; and the path selection unit is configured to select one of the candidate first parking path or the candidate second parking path on the basis of the evaluation function.

2. The parking assistance apparatus according to claim 1, wherein when parking is assisted for reverse parking in which the vehicle is reverse parked in the parking space, the candidate forward drive start path includes a path for moving the vehicle forward from the initial position to the first park-out position.

3. The parking assistance apparatus according to claim 2, wherein the candidate forward drive start path includes a path that allows the vehicle to reach the first park-out position from the initial position through one of a single-side steering maneuver or an S-turn steering maneuver.

4. The parking assistance apparatus according to claim 2, wherein the candidate reverse drive start path includes a path for moving the vehicle backward from the initial position to a back-up position, and then moving the vehicle forward from the back-up position to the second park-out position.

5. The parking assistance apparatus according to claim 4, wherein the back-up position is a position away from the initial position by a predetermined distance along a vehicle orientation of the vehicle, or a position at which the vehicle is located opposite an obstacle behind with a predetermined gap therebetween when the vehicle is backed up.

6. The parking assistance apparatus according to claim 4, wherein the candidate reverse drive start path includes a path that allows the vehicle to reach the second park-out position from the back-up position through one of a single-side steering maneuver or an S-turn steering maneuver.

7. The parking assistance apparatus according to claim 1, wherein the evaluation function includes at least one of a movement time needed to move the vehicle from the initial position to the target parking position along the parking path, a sensing range of an external recognition sensor of the vehicle, or a distance between the initial position and the target parking position.

\* \* \* \* \*